(12) United States Patent
Cosgrove et al.

(10) Patent No.: US 12,083,495 B2
(45) Date of Patent: Sep. 10, 2024

(54) MONOLITHIC TRACE-CONTAMINANT SORBENTS FABRICATED FROM 3D-PRINTED POLYMER PRECURSORS

(71) Applicant: ADVANCED FUEL RESEARCH, INC., East Hatford, CT (US)

(72) Inventors: Joseph E. Cosgrove, Colombia, CT (US); Marek A. Wójtowicz, East Hartford, CT (US); Michael A. Serio, Sturbridge, MA (US); Andrew E. Carlson, Higganum, CT (US)

(73) Assignee: Advanced Fuel Research, Inc, East Hartford, CT (US)

( * ) Notice: Subject to any disclaimer, the term of this patent is extended or adjusted under 35 U.S.C. 154(b) by 877 days.

(21) Appl. No.: 16/920,538

(22) Filed: Jul. 3, 2020

(65) Prior Publication Data
US 2021/0001305 A1 Jan. 7, 2021

Related U.S. Application Data

(60) Provisional application No. 62/871,106, filed on Jul. 6, 2019, provisional application No. 62/870,718, filed on Jul. 4, 2019.

(51) Int. Cl.
*B01J 20/20* (2006.01)
*B01D 53/04* (2006.01)
(Continued)

(52) U.S. Cl.
CPC ............. *B01J 20/20* (2013.01); *B01D 53/04* (2013.01); *B01J 20/28042* (2013.01); *B01J 20/3007* (2013.01); *B01J 20/3078* (2013.01); *B01J 20/3085* (2013.01); *B33Y 10/00* (2014.12); *B33Y 70/00* (2014.12); *B33Y 80/00* (2014.12); *C01B 32/318* (2017.08); *C01B 32/336* (2017.08); *B01D 2253/102* (2013.01);
(Continued)

(58) Field of Classification Search
CPC . B01D 53/04; B01J 20/20; B01J 20/28; B01J 20/30; B33Y 10/00; B33Y 70/00; B33Y 80/00; C01B 32/318; C01B 32/336
See application file for complete search history.

(56) References Cited

U.S. PATENT DOCUMENTS

| 8,231,712 B2 | 7/2012 | Wójtowicz |
| 8,615,812 B2 | 12/2013 | Wójtowicz |
| 9,073,039 B2 | 7/2015 | Wójtowicz |

FOREIGN PATENT DOCUMENTS

CN 106669636 A * 5/2017

OTHER PUBLICATIONS

Paul et al., "Requirements and Sizing Investigation for Constellation Space Suit Portable Life Support System Trace Contaminant Control," AIAA 2010-6065, 40th ICES Conf., 2010.
(Continued)

*Primary Examiner* — Sharon Pregler
(74) *Attorney, Agent, or Firm* — Ira S Dorman

(57) ABSTRACT

High purity carbon sorbent monoliths that are particularly effective for the adsorption and subsequent desorption of trace-contaminants, such as ammonia, are produced by 3D-printing polymer monoliths, carbonizing them, and subsequently activating them to produce an effective amount of at least one type of oxygen species on exposed carbon surfaces. The high purity carbon sorbent monoliths are vacuum-regenerable on a time scale of a few minutes.

12 Claims, 19 Drawing Sheets

(51) Int. Cl.
*B01J 20/28* (2006.01)
*B01J 20/30* (2006.01)
*B33Y 10/00* (2015.01)
*B33Y 70/00* (2020.01)
*B33Y 80/00* (2015.01)
*C01B 32/318* (2017.01)
*C01B 32/336* (2017.01)

(52) U.S. Cl.
CPC .. *B01D 2253/304* (2013.01); *B01D 2253/306* (2013.01); *B01D 2253/308* (2013.01); *B01D 2253/3425* (2013.01); *B01D 2257/406* (2013.01); *B01D 2257/70* (2013.01); *B01D 2259/40083* (2013.01); *B01D 2259/4575* (2013.01)

(56) References Cited

OTHER PUBLICATIONS

Paul & Jennings, "Results of the Trace Contaminant Control Trade Study for Space Suit Life Support Development," SAE 2009-01-2370, 39th ICES conf., Savannah, GA, USA, 2009.

Wójtowicz et al., "Reversible Ammonia Sorption on Carbon for the Primary Life Support System (PLSS)," AIAA 2012-3437, 42nd ICES conf., San Diego, CA, USA, 2012.

Wójtowicz et al., "Adsorption of Ammonia on Regenerable Carbon Sorbents," ICES-2015-179, 42nd ICES conf., Bellevue, WA, USA, 2015.

Wójtowicz et al., "Monolithic Trace-Contaminant Sorbents Fabricated from 3D-printed Polymer Precursors," ICES-2019-286, 49th ICES conf., Boston, MA, USA, 2019.

Cybulski & Moulijn, "Monoliths in Heterogeneous Catalysis," Catal. Rev.—Sci. Eng. 36(2), 179-270, 1994, Taylor & Francis, UK.

* cited by examiner

MONOLITHIC TRACE-CONTAMINANT SORBENTS FABRICATED FROM 3D-PRINTED POLYMER PRECURSORS

CROSS-REFERENCE TO RELATED APPLICATIONS

This application claims the benefit of United States provisional application Nos. 62/870,718 and 62/871,106, both bearing the foregoing tide, and filed on Jul. 4, 2019 and Jul. 6, 2019, respectively, the entire specifications of which is incorporated hereinto by reference thereto.

STATEMENT REGARDING FEDERALLY SPONSORED RESEARCH OR DEVELOPMENT

The United States Government has rights in this invention under the following contract: National Aeronautics and Space Administration contract No. 80NSSC18P1961.

BACKGROUND OF THE INVENTION

The development of regenerable life support systems is critically important for the advancement of NASA's space-exploration projects. In addition to carbon dioxide ($CO_2$) and water vapor ($H_2O$) control, trace-contaminant (TC) removal plays a key role in life support systems, ensuring high quality air for the crew during Extravehicular Activities (EVAs) and also on board spacecraft. This invention addresses the fabrication of structured (monolithic), carbon-based TC sorbents for the space suit used in EVAs. The approach to sorbent fabrication involves the following steps: (1) preparation of the precursor material (polymer) in a desired shape using 3D printing; (2) precursor carbonization (pyrolysis) to produce a carbon monolith; and (3) monolith activation to obtain the desired pore-structure characteristics, the desired surface chemistry (functional groups), and good TC-sorption performance (high sorption capacity and rapid vacuum-regeneration). The subject of this invention is: (1) the demonstration of the use of 3D printing to create polymer monoliths with complex geometries, e.g., honeycomb structures, subsequently converted into effective TC sorbents upon carbonization and activation, while preserving much of their original shape and strength; (2) the demonstration of effective ammonia and formaldehyde removal in the presence of $CO_2$ and humidity; also, the demonstration of rapid sorbent regeneration; and (3) the development of a sub-scale sorbent prototype for use by NASA.

The starting materials for the sorbent-fabrication process are polymer-based precursors that produce microporous carbon upon carbonization (pore size $d_p$<2 nm). The use of the predominantly microporous monolithic carbon is associated with the following benefits: (a) high trace contaminant sorption capacity; (b) low pressure drop; (c) rapid vacuum (pressure-swing) desorption due to thin monolith walls, e.g., in the 0.10-1.0 mm range, and due to the low pressure drop; (d) good thermal management (high thermal conductivity and low adsorption/desorption thermal effects associated with physisorption); and (e) good resistance to dusty environments. The fully vacuum-regenerable sorbent system resulting from this invention is in contrast to the currently used EVA air-revitalization systems, which involve oversized, non-regenerable packed beds of acid-impregnated activated carbon (AC) for TC control. For the sake of clarity, it should be understood that, unless stated otherwise, all references to monoliths made in this specification, in the claims, and in the abstract, are references made to the monoliths produced in accordance with the present invention.

In general, the trace contaminants of primary interest are ammonia and formaldehyde as they are the only ones that are likely to exceed the Spacecraft Maximum Allowable Concentration (SMAC) levels within the space suit (20 ppm for ammonia). It will be appreciated by those skilled in the art that the sorbents described in this disclosure may be used in other applications where trace contaminants need to be removed from a gas environment using sorbents that can be regenerated by exposure to vacuum or a flow of purge gas.

Trace-contaminant removal in spacecraft environments has a long history, and it was reviewed by Paul and Jennings of NASA Johnson Space Center (Paul, H. L. and Jennings, M. A., "Results of the trace contaminant control trade study for space suit life support development," Proc. 39th Int. Conf. on Environmental Systems (ICES), Savannah, Georgia, Jul. 12-16, 2009, SAE technical paper No. 2009-01-2370, SAE International, 2009). It was concluded that "there is currently no technology that is used in any industry that will perform better than activated charcoal for the PLSS application." Several approaches to carbon regeneration have been attempted (reverse airflow, steam regeneration, and vacuum regeneration), but the challenge of excessive regeneration temperature, and of long desorption time scales, remains to be resolved. In previous work, this problem was addressed through tailoring the porous structure of carbon sorbents, and through the use of oxidative carbon-surface pretreatment (U.S. Pat. No. 9,073,039; Wójtowicz et. al., "Reversible Ammonia Sorption on Carbon for the Primary Life Support System (PLSS)," Proc. 42nd International Conference on Environmental Systems, American Institute of Aeronautics and Astronautics, San Diego, California, AIAA-2012-3437, 2012; Wójtowicz et. al., "Adsorption of ammonia on regenerable carbon sorbents," Proc. 45th International Conference on Environmental Systems (ICES), Bellevue, WA, Paper No. ICES-2015-179, 2015). In spite of the tremendous progress made (vacuum regeneration possible and the enhancement of sorption capacity as a result of surface oxidation), vacuum regeneration time at room temperature is still substantial (0.25-12 hours). In addition, the manufacture of sorbent monoliths was crude (manually drilled holes), which resulted in large monolith channel wall thickness and significant gas-diffusion resistance. The present invention addresses the above challenges through the use of 3D printing and the polymers that are compatible with 3D printing, and that also produce highly microporous carbons upon carbonization and activation. It should be noted that polyvinylidene chloride (PVDC), which was extensively used in the past (e.g., U.S. Pat. No. 9,073,039; Wójtowicz et. al., 2012; Wójtowicz et. al., 2015; U.S. Pat. Nos. 8,615,812; 8,231,712), is not compatible with 3D printing, mainly due to the release of large amounts of hydrogen chloride upon heating. Therefore, polymers other than PVDC are the subject of the present invention.

The approach to TC sorption used in invention is based on physisorption on highly microporous carbon derived from polymers. The pore sizes are close to molecular dimensions, which ensures sufficiently strong van der Waals forces to obtain high TC-sorption capacities. In contrast, most commercial activated carbons contain only a small or modest percentage of microporosity, and this is why their sorption-capacity performance is low or modest, unless enhanced by chemisorption on acidic sites. The fact that the underlying principle for the sorbents of this invention is physisorption rather than chemisorption makes vacuum and thermal regeneration fast and reversible. Also, the high purity of the carbon derived from polymer precursors makes it possible to keep the carbon surface acidity low, which facilitates the reversible TC sorption.

Another important consideration in the design of Trace Contaminant Control Systems (TCCS) is pressure drop. Granular sorbent offers significant resistance to gas flow, which is associated with a high demand for fan power. Thus, there is a great need for an effective TC sorbent that could be regenerated by short exposure to vacuum at low temperatures (under 40° C. for several minutes). A monolithic structure (e.g., a carbon sorbent honeycomb with thin walls) is desired to reduce fan-power consumption and to facilitate rapid vacuum-regeneration. The fabrication and use of monolithic carbon structures for reversible TC sorption/desorption is disclosed in the present specification.

BRIEF SUMMARY OF THE INVENTION

The broad objects of the present invention are to provide novel carbon sorbent monoliths produced from 3D-printed polymer monoliths, provide a method for their fabrication, and to demonstrate the effectiveness of these sorbents in adsorption of trace contaminants, particularly ammonia, as well as rapid vacuum-regeneration of such sorbents. It is also an object of the invention to provide novel carbon monoliths for effectively removing trace contaminants from gaseous environments. Another object of the invention is to provide carbon sorbent monoliths derived from 3D-printed polymer monoliths.

It has now been found that certain of the foregoing and related objects of the invention are achieved by the provision of a method for the removal of trace contaminants from a gaseous environment, comprising the steps: providing a porous, carbon sorbent monolith that is capable of trace-contaminant sorption and desorption; causing a volume of contaminated gas to pass through the sorbent, to thereby effect sorption of trace contaminants from the gas volume; and exposing the sorbent monolith to a vacuum environment, advantageously at ambient temperature, to thereby effect desorption and removal of a substantial portion of the adsorbed trace contaminants therefrom. The carbon sorbent monolith employed is produced by 3D-printing a polymer monolith from a polymer precursor, carbonizing the polymer monolith so as to provide a high-purity carbon monolith, which is exposed to an oxidizing environment under conditions sufficient to produce an effective amount of at least one oxygen species on exposed surfaces, such that the sorbent contains normally at least 0.10, and preferably at least 0.25, and most desirably at least 0.5, weight percent of the oxygen species added during the oxidation (activation) step. Carbon activation also creates internal surface area and porosity, which, together with the oxygen surface species present on the carbon surface, are instrumental in the effective sorption of trace contaminants. The internal surface area is normally higher than 100 m$^2$/g, and preferably at least 300 m$^2$/g, and most desirably at least 500 m$^2$/g.

The oxygen species may be produced by exposing the sorbent to air, oxygen, carbon dioxide, steam, ozone, hydrogen peroxide, nitric acid, or mixtures thereof, or to another suitable oxidizing environment. In many instances, the oxidizing environment will most desirably comprise air at a temperature in the range 150° C. to 400° C., with an exposure time of at least 5 minutes; preferably, the temperature range will be 250° C. to 325° C. and the exposure time will be 24 to 300 hours. When the oxidizing environment is other than air the temperature and exposure time will be varied so as to produce equivalent levels of surface oxidation. In any event, the carbon of which the carbon sorbent monolith consists will normally be substantially free from mineral contaminants in elemental or molecular state.

The polymer precursor used in the method will desirably be selected from the group consisting of polyether ether ketone (PEEK), polyetherimide (PEI), and polycarbonate (PC), and mixtures thereof, and most desirably it will comprise at least 70 weight percent of PEEK. Furthermore, the polymer precursor will desirably comprise reinforcement in the form of fibers, preferably carbon fibers, for improved shape retention during carbonization and enhanced strength. In preferred embodiments, the majority of pores of the sorbent will not substantially exceed 2 nanometers in size.

The carbon sorbent monoliths utilized in the trace contaminant removal method may advantageously be produced by constraining the polymer monoliths during the fluid stage of carbonization (polymer melting) using structural supports to prevent the loss of shape of polymer monoliths during carbonization. In a preferred embodiment, the structural supports comprise of vertically positioned stainless-steel dowel pins as well as top, bottom, and side support plates. In another preferred embodiment, the structural supports comprise a side support plate as well as pins extending from top and bottom support plates in what can be termed a "bed-of-nails" assembly.

Other objects of the invention are attained by the provision of a method for the production of a sorbent monolith, and by the provision of a sorbent monolith so produced, comprising the steps: 3D-printing a polymer monolith from a polymer precursor; carbonizing the polymer monolith so as to produce a high-purity carbon monolith; and exposing the high-purity carbon monolith to an oxidizing environment under conditions sufficient to produce at least one oxygen species on exposed surfaces, the sorbent containing at least 0.10, and preferably at least about 0.25, weight percent of the oxygen species added during the oxidation (activation) step. The nature of the polymer material used, the carbonization conditions employed, the oxidizing conditions used, and the characteristics of the sorbent may be as hereinabove and hereinafter described.

DETAILED DESCRIPTION OF THE INVENTION

Precursor Selection

Three polymers were initially chosen, and then one of them was down-selected for further work, and the following criteria were used for precursor selection:
- compatible with 3D printing
- good shape retention upon carbonization and activation (A high carbon yield during carbonization, i.e. a low volatile-matter content, which is favorable for shape retention; furthermore, high carbon yields improve process economics)
- good TC sorption and sorbent regeneration To ensure that the selected polymers were indeed compatible with 3D printing, commercially available 3D printing filaments were chosen. They were ordered and received from 3DXTECH Additive Manufacturing of Grand Rapids, Michigan, some of them reinforced with ~10 wt % carbon fiber (CF): polyether ether ketone (PEEK and PEEK/CF), polyetherimide (PEI/CF), also known as Ultem, and polycarbonate (PC and PC/CF). PEEK powder, supplied by Goodfellow USA of Coraopolis, Pennsylvania, was also used in some experiments.

Carbonization and Activation

A standard laboratory tube furnace was used for carbonization, and several heating profiles were utilized, some of them with a single heating rate of 5 K/min, others with hold times at about 500° C. The final carbonization temperature used was 800° C., and nitrogen was used as a carrier gas. In several experiments, polymer/carbon-fiber filament samples were rapidly inserted into the tube furnace preheated to 450° C., 500° C., 550° C., and 600° C., and held at the above temperatures for ~30 min. It was found that the carbonization conditions did not have a strong effect on shape retention for the PEEK polymer. For this reason, unless indicated otherwise, only results obtained using a heating rate of 5 K/min are reported. Carbon activation was carried out in a flow of air at 325° C. to a burn-off of ~20 wt % using a tube furnace.

Pore-Structure Characterization Methodology

An automated gas-sorption system ASiQwin (manufactured by Quantachrome Instruments of Ashland, Virginia)

was used for collecting and processing nitrogen-isotherm data for carbon sorbents. Prior to adsorption-isotherm measurements, each sample was outgassed under vacuum at 300° C. for at least 3 hours. Nitrogen-adsorption isotherms were determined at 77 K, and these data were used to perform the following analyses: (a) Brunauer, Emmett, and Teller (BET) surface area; (b) pore volume; (c) Dubinin-Radushkevich (D-R) micropore surface area and micropore volume; and (d) pore-size distribution of micropores using the Density Functional Theory (DFT).

Sorbent Testing System and Procedure

Figure 1:
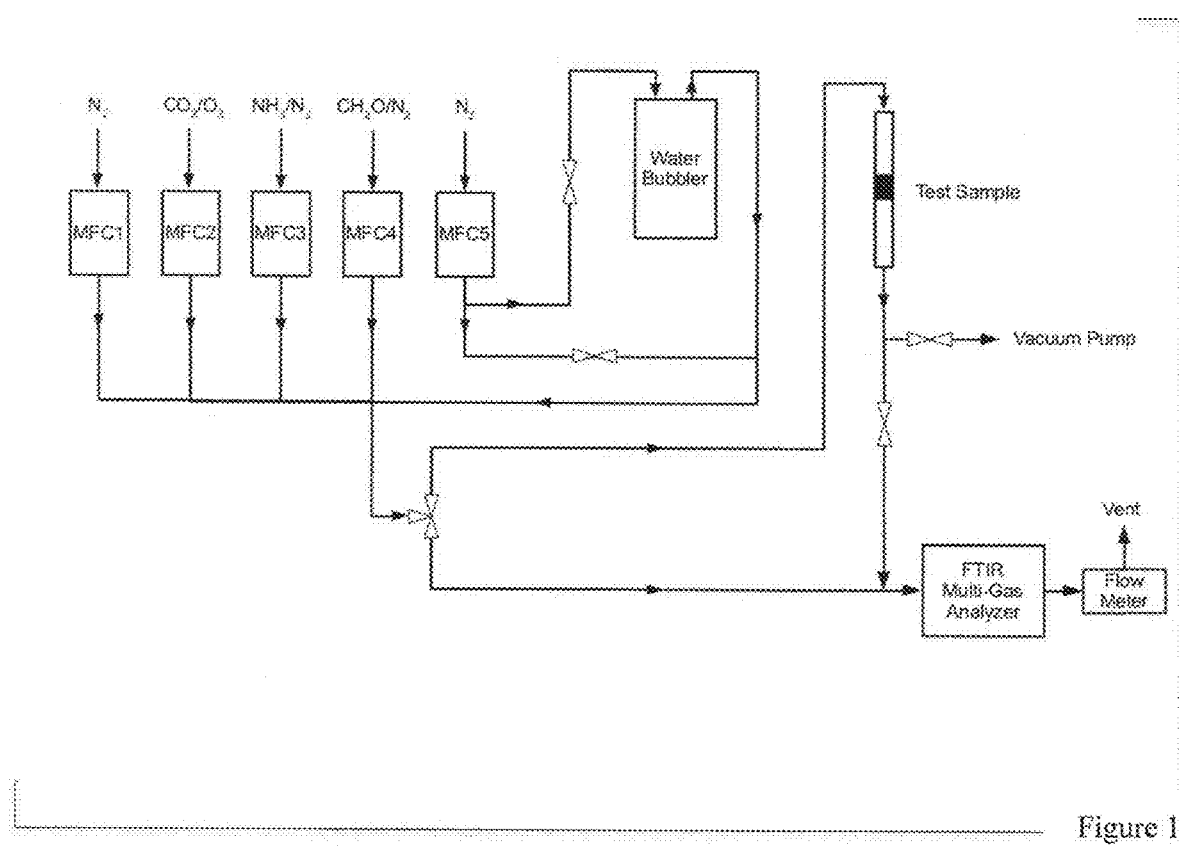
FIG. 1 is a schematic representation of the sorption/desorption capacity test apparatus. MFC1 through MFC5 are mass-flow controllers. CH$_2$O is formaldehyde, which is supplied from a permeation-tube assembly.

The ammonia and formaldehyde sorption capacities were determined using the testing system shown schematically in FIG. 1. The measurements of both cyclic and total (equilibrium) TC sorption capacity of sorbents were possible. The testing was performed in two stages: (a) $NH_3$/formaldehyde adsorption, where the gas stream was passed through the sorbent monolith at pressures close to atmospheric; and (b) $NH_3$/formaldehyde desorption, where the sorbent monolith was exposed to vacuum. The test cell containing the TC sorbent was placed in a temperature-controlled enclosure (not shown in FIG. 1). $CO_2/H_2O/NH_3$/formaldehyde concentration determination was carried out using an FTIR analyzer downstream of the reactor. The inlet gas composition was similar to that typical for the Portable Life Support System (PLSS): ~20 ppm $NH_3$, ~0.5 ppm formaldehyde, ~1.0 vol. % $CO_2$, 29 vol. % $O_2$, and balance nitrogen. The experimental procedure used in equilibrium sorption measurements is described below.

The system incorporates a Fourier transform infrared (FTIR) multi-gas analyzer, which is used for ammonia, formaldehyde, carbon dioxide, and water quantification. Using mass flow controllers, ammonia/nitrogen, $CO_2$/oxygen, and formaldehyde/nitrogen gas mixtures are blended to achieve the desired gas concentrations. The flow of formaldehyde is generated by placing a permeation tube within a flow of nitrogen. For humidifying the gas stream, a portion of the nitrogen flow is routed through a water bubbler, using fine needle valves for adjustment. During testing, the final mixture is first directed through a sample bypass line, to establish the baseline trace contaminant and humidity conditions. The gas is then re-directed through the sample "cell" for the sorbent adsorption testing. The sample cell consists of a glass tube that contains the sorbent sample. It is mounted in a vertical orientation with the gas inlet at the top of the cell so that gas flow is in a downward direction.

The 18 mm diameter multi-channel carbon sorbent monoliths are wrapped in Teflon tape and then inserted into a 22 mm diameter glass tube. The sorbent monolith height is typically 0.6 cm. The Teflon tape assures a snug and reasonably gas-tight fit between the foam sample and the quartz tubing. For the granular sorbents, about 0.200 g of sieved sample (+45-20 mesh) is loaded into a 5.5-mm i.d. glass tube and held in place using ceramic wool on both ends, resulting in a carbon bed length of about 25 mm. The gas flow rate used is 1 L/min.

Gas-concentration data are collected using the FTIR analyzer at one minute intervals. The experimental procedure involves monitoring the trace-contaminant breakthrough curves (outlet concentration versus time) and terminating the adsorption measurement when the trace-contaminant concentration reaches at least 90% of the inlet concentration (after breakthrough).

For vacuum regeneration experiments, the sample cell is removed from the test stand and installed in a high vacuum chamber pumped by a turbomolecular pump (base vacuum of about $10^{-6}$ Torr). After the vacuum regeneration, the sample cell is re-installed on the test stand and the trace-contaminant adsorption is measured again to determine the regenerated capacity.

Sorbent Fabrication and Characterization

1. Shape Retention During Carbonization

Samples of PC, PEI, and PEEK filaments were used in preliminary screening experiments to determine, qualitatively, the degree to which a given material could retain its shape upon carbonization.

Figure 2:
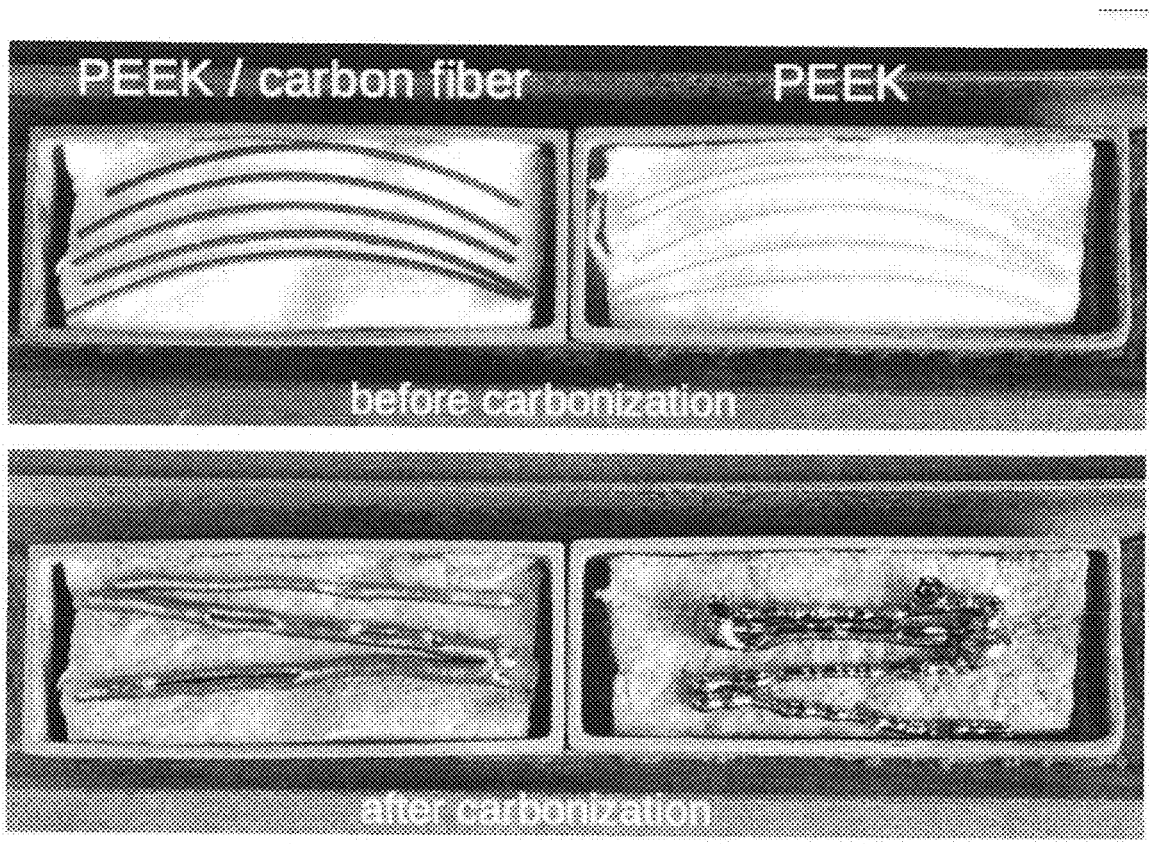
FIG. 2 consists of photographs of PEEK and PEEK/CF filaments, contained in ceramic boats, before and after carbonization at a final temperature of 800° C. and a heating rate of 5 K/min; carbon yield: 53.7 wt % of the original PEEK. It should be noted that some filaments shifted upon handling and then fused.
Figure 3:
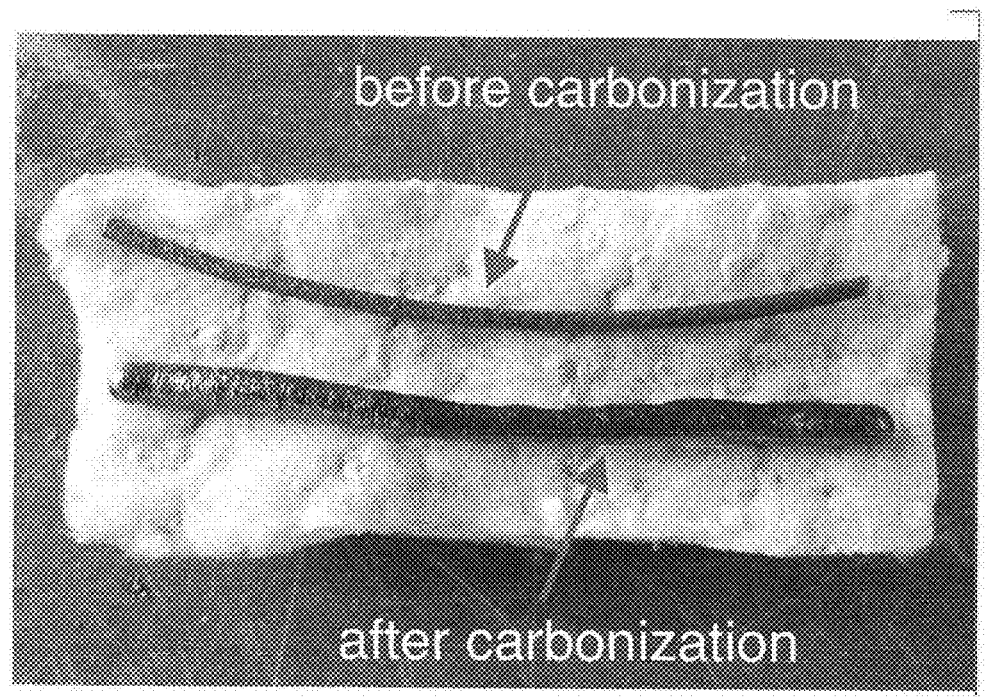
FIG. 3 consists of photographs of PEEK/CF, lying on a pad, before and after insertion into a tube furnace preheated to 575° C. and holding at the above temperature for 30 minutes.

Results of carbonization experiments performed using PEEK filaments, with and without carbon-fiber reinforcement, are shown in FIG. 2 and FIG. 3. The second polymer used was PEI. Many 3D-printing companies work with PEI, and this material is considered a high-performance polymer with good thermal resistance, although not as good as PEEK. A literature survey revealed that the carbonization yields of PEI are similar to those of PEEK (>50 wt %), which makes PEI an attractive option to consider. Samples of carbon fiber reinforced PET and PC filaments were used to evaluate their carbonization properties in terms of shape retention. It was found that PEI showed better shape retention than PC, but not as good as PEEK (see FIG. 4).

The following conclusions can be made on the basis of the above carbonization tests:

Polymer/fiber filaments retain shape better than pure polymer filaments during carbonization (see FIG. 2).

Figure 4:
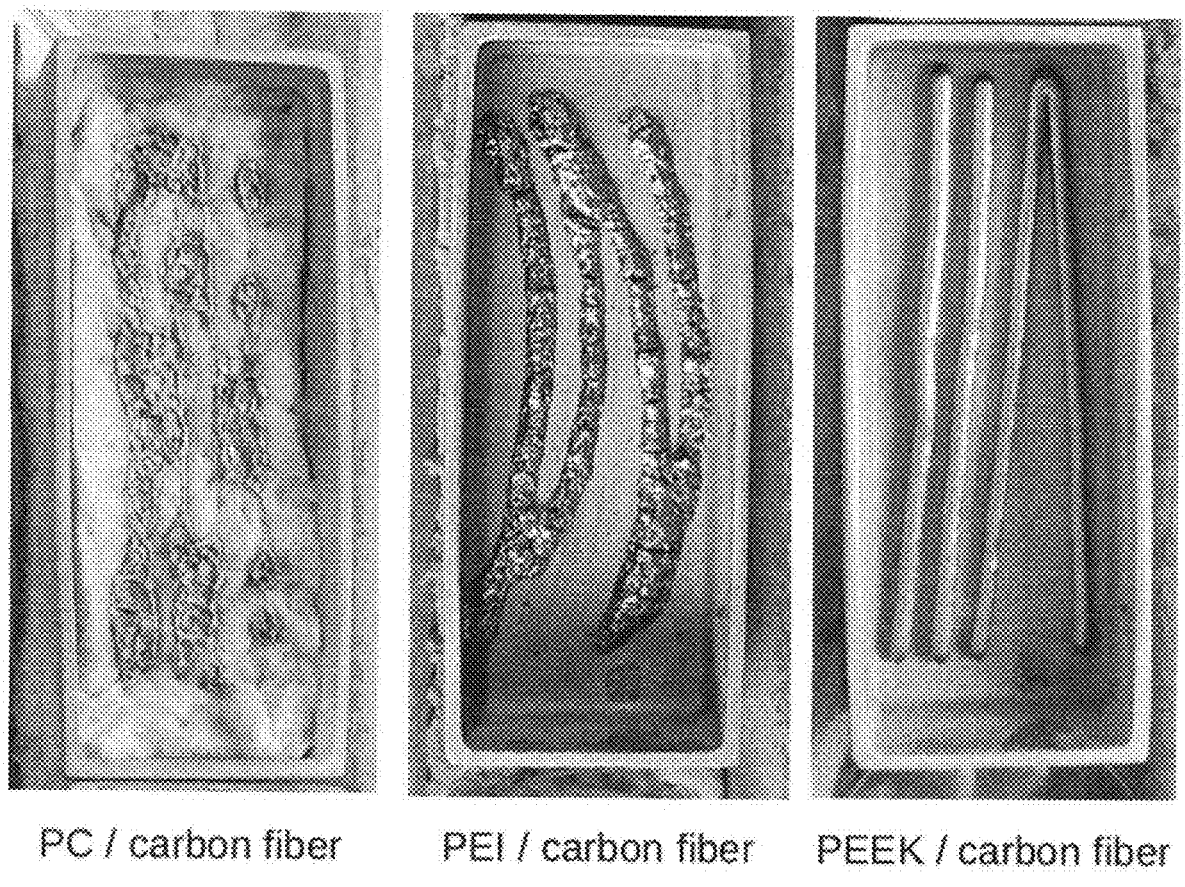
FIG. 4 consists of photographs comparing post-carbonization shape retention characteristics of PC, PEI, and PEEK filaments reinforced with carbon fiber.

PEEK appears to hold shape better than PEI, and much better than PC (see FIG. 4).

PEEK has a much higher carbon yield than PC (54 wt % and 14 wt %, respectively); also, higher than the carbon yield in PVDC carbonization (25 wt %), which was reported in previous studies (U.S. Pat. No. 9,073,039; Wójtowicz et. al., 2012; Wójtowicz et. al., 2015; U.S. Pat. Nos. 8,615,812; 8,231,712)

The heating rate does not seem to have a strong effect on filament shape retention, at least for PEEK.

Ammonia and formaldehyde sorption and sorbent regeneration properties were later found to be excellent for the PEEK-based carbon, as discussed below. Consequently, carbon fiber reinforced PEEK (PEEK/CF) was selected for further work.

2. Monolith Design and Fabrication

Figure 5:
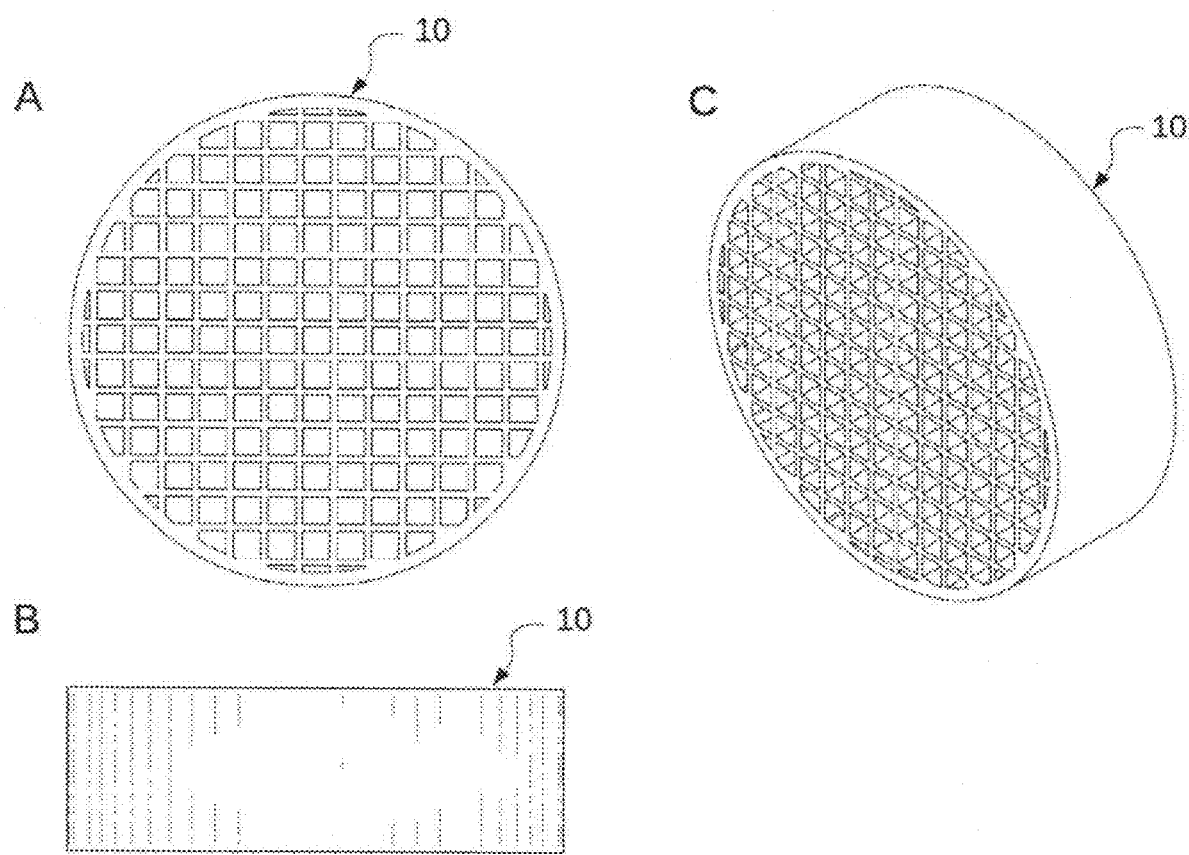
FIG. 5 (A, B, and C) shows top, front (or rear), and isometric views of a baseline monolith (not to scale). The square channel cell size is 1.0 mm, the channel wall thickness is 0.25 mm, the monolith diameter and thickness are 18 mm and 6.0 mm, respectively, and the monolith outer wall thickness is 0.5 mm.

The solid model of the 1 mm square channel monolith, generally designated by the numeral 10 in FIG. 5, with an 18-mm diameter, 6-mm height, a channel-wall thickness of 0.25 mm, and a 0.5-mm outer wall was created and used as a baseline design (see FIG. 5). A square channel honeycomb geometry is quite typical for monoliths. The inner channel and wall dimensions, given above, are expected to accommodate some swelling during carbonization, while still allowing gas to flow at rates that ensure low pressure drop across the monolith.

Figure 6:
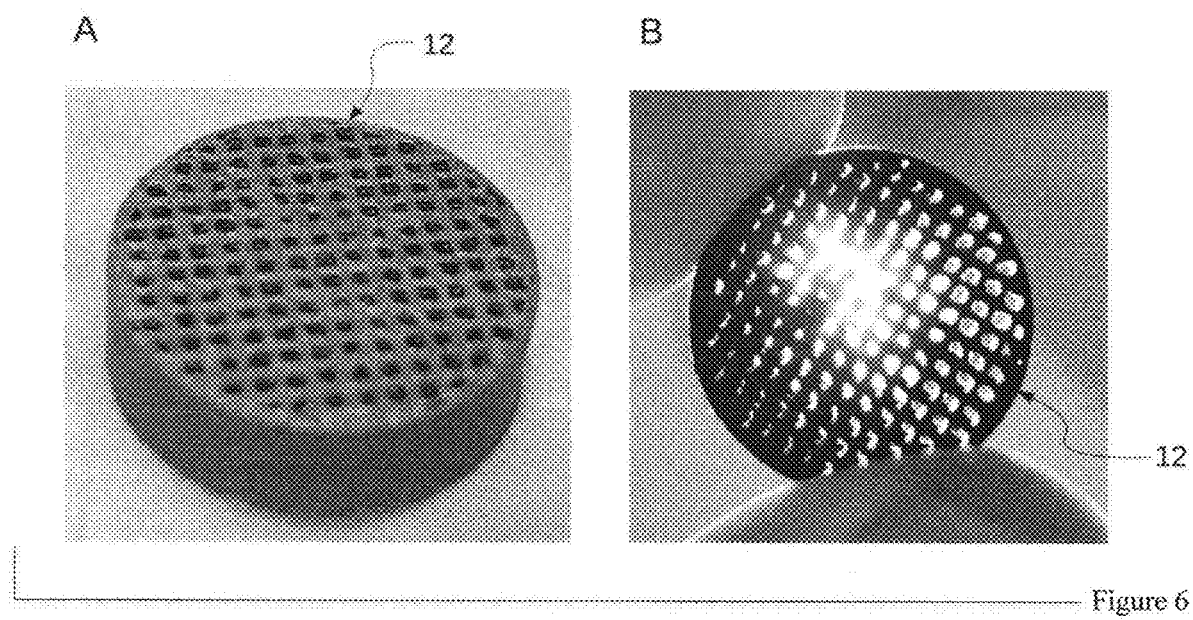
FIG. 6 (A and B) consists of photographs (isometric and front) of the polymer monolith 3D-printed using a PEEK/CF filament, held by hand in 6B. The target channel wall thickness was 0.25 mm.

A polymer monolith 3D-printed using PEEK/CF filament with a target channel wall thickness of 0.25 mm is shown in FIG. 6 (parts A and B), and generally designated by the numeral 12. It can be seen that the overall shape and channel structure is quite good. The channel walls are still thicker than prescribed, however, and some rounding of inside corners is evident.

Carbon fiber reinforced PEEK monoliths were carbonized, and it was found that shape retention was good for 0.5-mm thick monoliths, but problematic in the case of 3.0-mm thick monoliths. In order to understand the mechanism of polymer melting and carbonization during heat treatment, an experiment was designed in which the polymer sample was heated by an external furnace, while being visually observed through a mirror. It was found that PEEK monolith melting and fusion of channels took place in the temperature range 350-385° C., with swelling observed at about 450° C. A carbonization run was also performed using a thermogravimetric analyzer (TGA), which showed that the onset of devolatilization, indicated by sample weight loss, occurred well above 500° C. Therefore, it was concluded that melting happened before devolatilization, and this is why measures needed to be taken to prevent the loss of monolith shape at the melting stage.

Figure 7:
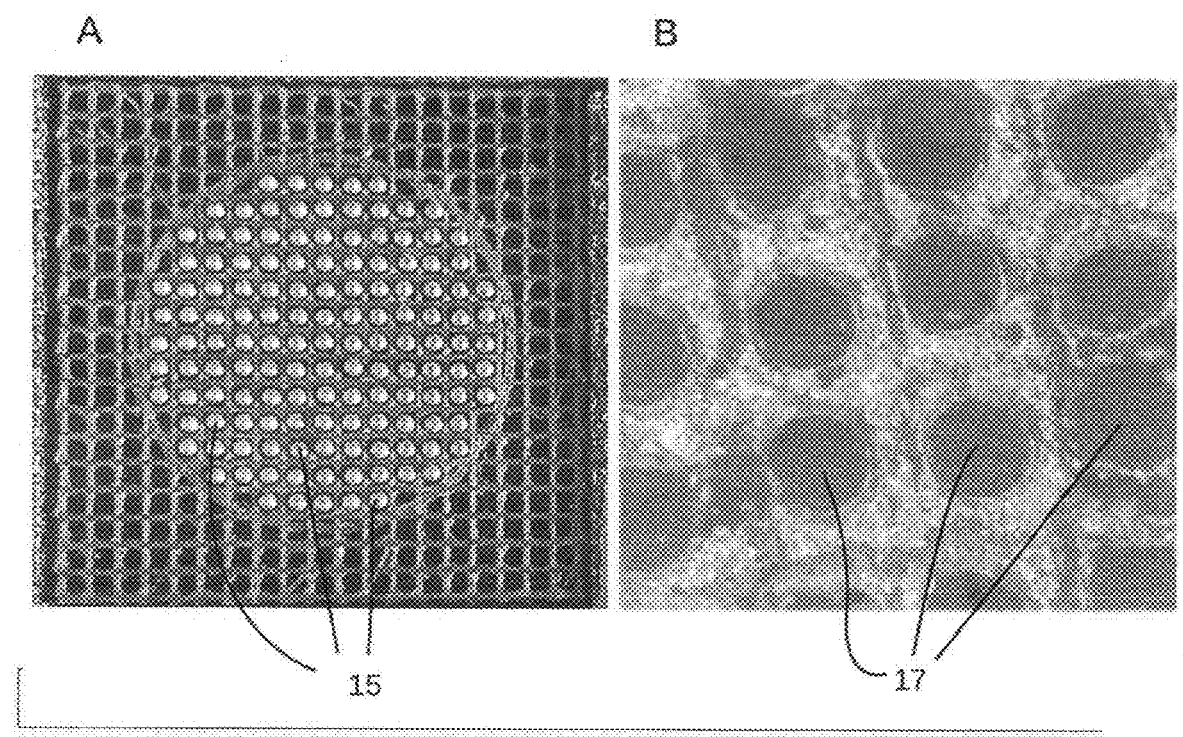
FIG. 7 (A and B) shows photographs of 1-mm square channel monolith (6-mm thick) carbonized at 800° C.: (A) PEEK/CF monolith loaded with 0.8-mm diameter "support" stainless-steel dowel pins prior to carbonization; and (B) a close-up of the carbonized monolith channels now having a circular cross-section.

The above considerations led to the idea of using support structures in the form of smooth, stainless-steel dowel pins, designated by the numeral 15 in FIG. 7A, inserted into monolith channels 17 in FIG. 7A and in FIG. 7B to prevent channel fusion during carbonization. The results for a 6-mm thick monolith are shown in FIG. 7, where much improved shape retention is observed than previously for the 3-mm thick monolith.

Figure 8:
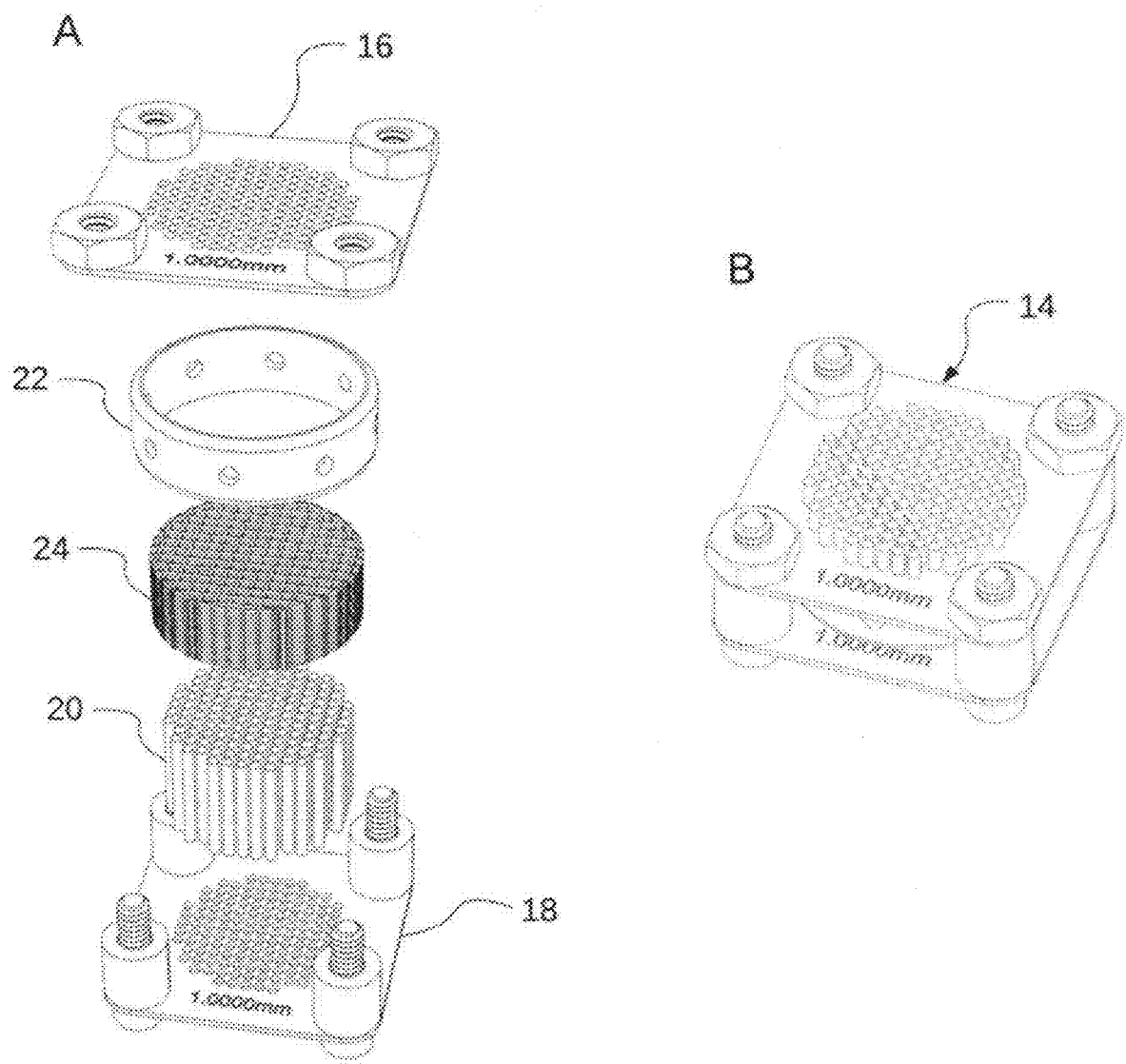
FIG. 8 shows the use of long pins anchored at the top and bottom plates for polymer monolith carbonization.

Since the dowel pins used in early experiments (see FIG. 7) experienced some lateral dislocation, it was decided to constrain their motion by anchoring them at the top and the bottom using two support plates. The modified assembly is shown in FIG. 8B and is generally designated by the numeral 14. It can be seen, with particular references to FIG. 7 and FIG. 8A, that, in addition to the top and bottom pin-support plates, 16, 18, supporting a set of pins, generally designated by the numeral 20, there is a stainless-steel collar 22 that encircles the 3D-printed PEEK/carbon-fiber monolith 24 so that the polymer is well supported from all sides during the melting stage. The whole assembly 14 is not gas tight, however, and the volatiles released during carbonization can freely escape from the monolith.

Figure 9:
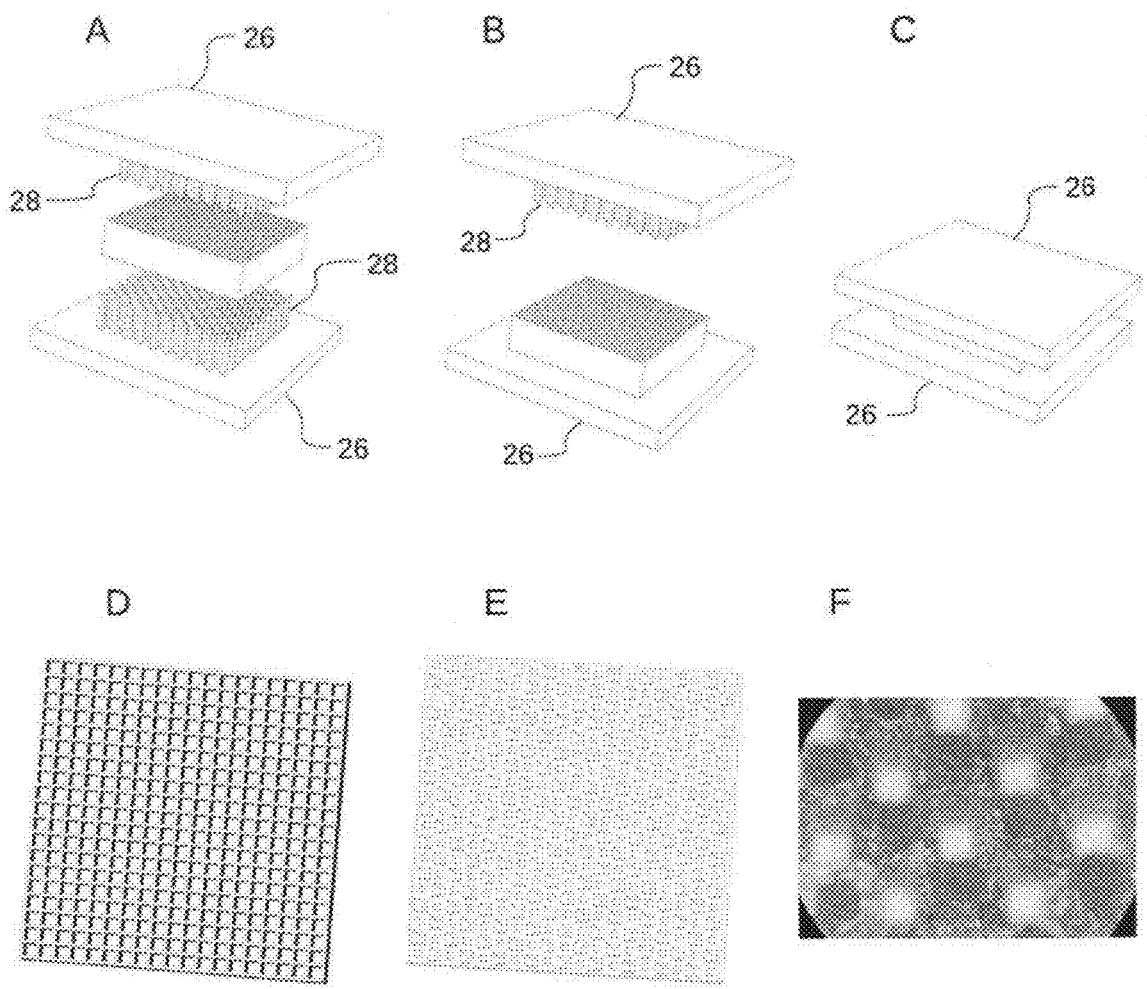
FIG. 9 (A, B, C, D, E, and F) illustrates the "bed-of-nails" concept: (A) top and bottom stainless-steel molds with tapered pins extending from each of the molds towards a 3D-printed polymer monolith; (B) the 3D-printed polymer monolith placed onto the bottom mold, with the pins of the bottom mold inside the monolith channels; (C) the fully assembled bed-of nails system ready for carbonization; (D) monolith channel structure prior to carbonization (straight channels with square cross-sections); (E) monolith channel structure after carbonization (tapered channels in alternating directions having square cross-sections); and (F) a close-up photograph of a carbon monolith carbonized using the bed-of-nails approach.

Since the use of individual support structures (pins) for each channel is tedious, an improved concept was put forward, in which two "beds of nails" (i.e. arrays of pins affixed on a support), generally designated by the numeral 26 and shown in FIG. 9A, FIG. 9B, and FIG. 9C, are inserted into monolith channels from both ends of the monolith (top and bottom). The bed-of-nails approach would allow for the convenient manufacture of carbonized monolith sorbents, with the reusable bed-of-nails molds fabricated using 3D-printing. As can be seen in FIG. 9A and FIG. 9B, the "nails" 28 in each of the molds have a square cross-section to fit into the square channels, and they are tapered for easier removal after carbonization. This design will result in monolith channels that are also tapered in a staggered manner, which results in slight change in channel geometry upon carbonization, as shown in FIG. 9D and FIG. 9E, where the channel structure before (part D) and after (part E) carbonization is shown schematically. A close-up photograph of monolith channels after carbonization is shown in FIG. 9F.

Figure 10:
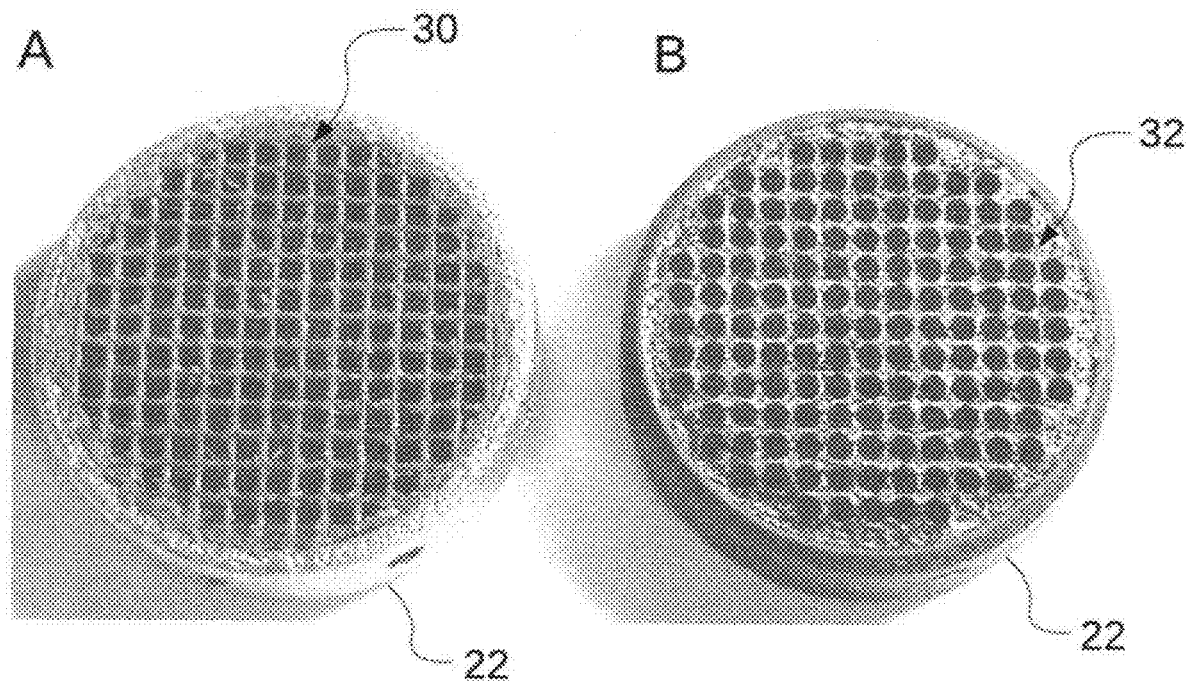
FIG. 10 (A and B) shows photographs of a sub-scale prototype carbon sorbent monolith before (part A) and after (part B) carbonization.

The assembly shown in FIG. 8B was used to prepare a subscale prototype sorbent monolith, which is shown prior to carbonization in FIG. 10A and generally designated by the numeral 30. It can be seen that the channels have a square cross-section prior to carbonization (FIG. 10A), whereas the carbonized monolith, shown in FIG. 10B and generally designated by the numeral 32, has round holes because round dowel pins were used. The sorbent monoliths shown in FIG. 10A and FIG. 10B are 18 mm in diameter and 6 mm in height (inside a 20 mm OD metal collar 22) with an approximate mass of 0.35 g, excluding the metal collar. The sorbent prototype is fully functional for testing at gas flow rates close to 1 L/min.

3. Pore-Structure Characterization

Two samples of PEEK/CF-based sorbents were characterized with respect to their surface area, pore volume, and pore-size distribution using nitrogen-adsorption isotherms at 77 K. Both carbon sorbent monoliths were found to have similar pore-structure characteristics, and results for one of them are discussed below.

Figure 11:
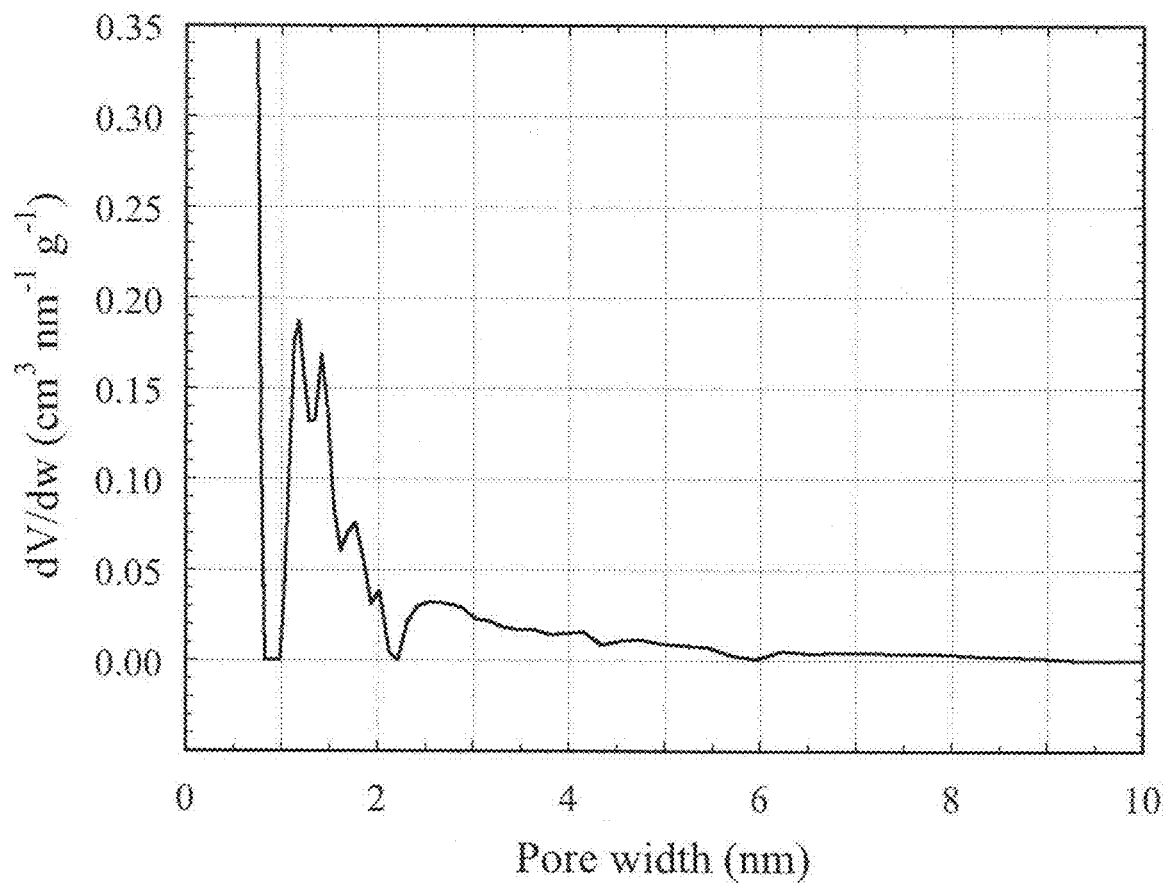
FIG. 11 is a curve illustrating the pore-size distribution of a PEEK/CF monolith carbonized at 800° C., activated at 325° C. in air for 84 h to ~18 wt % burn-off. The data are derived from nitrogen isotherms at 77 K using the Functional Density Theory (DFT).

As expected, the carbon sorbent activated to ~18% weight loss (burn-off) is mostly microporous (70% microporosity), i.e. having mainly pores smaller than 2 nm (20 Å), which is clearly seen in the pore-size distribution plot (FIG. 11). The BET surface area, total pore volume, and micropore volume were found to be $S_{BET}$=598 m²/g, $V_p$=0.312 cm³/g, and $V_{micro}$=0.217 cm³/g, respectively. The above values are expressed per gram of carbon monolith, which contains both PEEK-derived carbon and about 21 wt % of the carbon-fiber reinforcement. (The original carbon-fiber content increases from ~10 wt % to ~21 wt % upon carbonization and activation, assuming that carbon fiber does not undergo devolatilization and activation.) Accounting for the presence of carbon fibers, the surface area, total pore volume, and micropore volume of the PEEK-carbon (exclusive of carbon fiber) were calculated to be: $S^*_{BET}$=755 m²/g, $V^*_p$=0.394 cm³/g, and $V^*_{micro}$=0.274 cm³/g, respectively.

4. XPS Data

Figure 12:
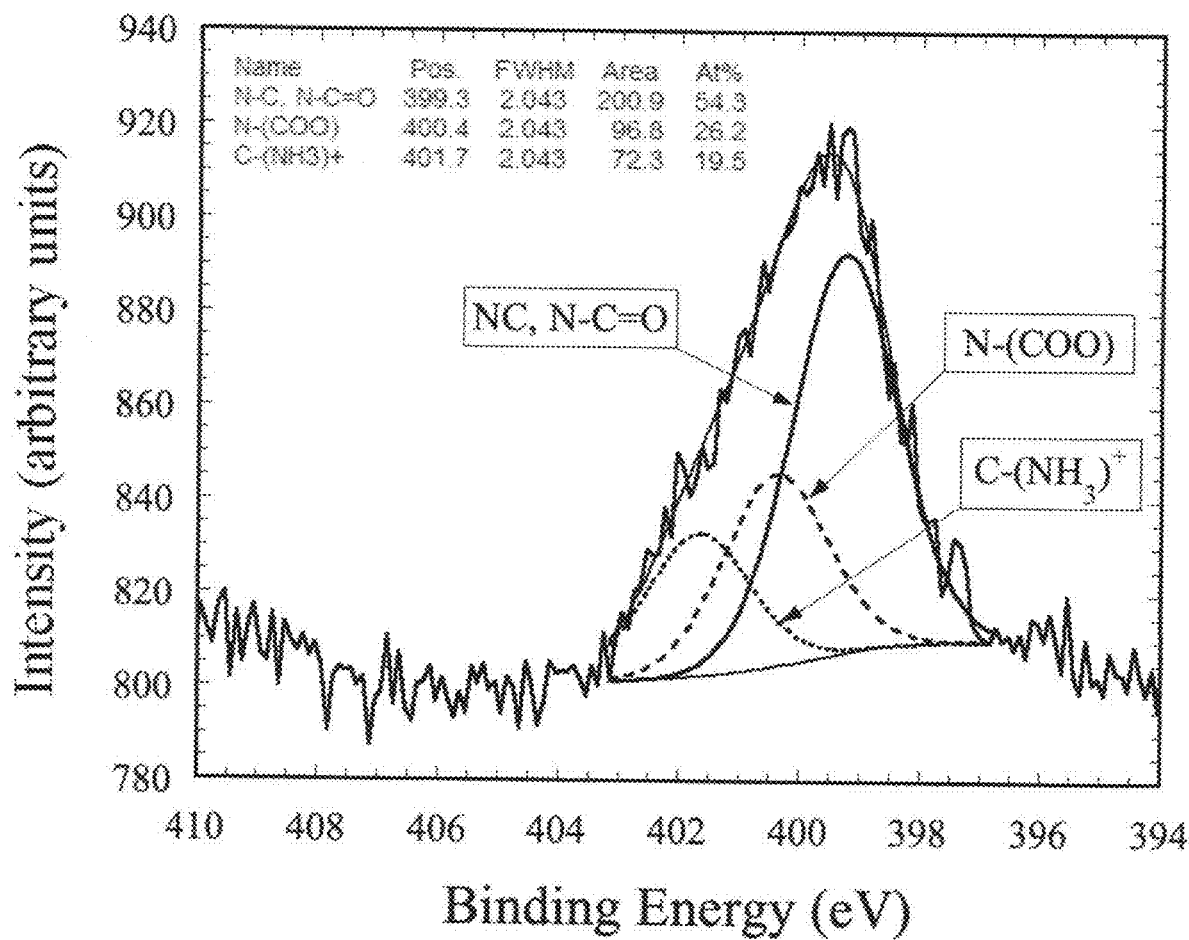
FIG. 12 consists of curves illustrating XPS data for carbonized and activated PEEK/CF sorbent sample exposed to ammonia (C+A+$NH_3$).

X-Ray Photoelectron Spectroscopy (XPS) analysis was used to gain insights into the carbon surface chemistry and the relative changes produced by carbon activation and exposure to ammonia. The following three PEEK/CF samples were analyzed for relative amounts of carbon, oxygen, and nitrogen, and also for the functional groups present on the carbon surface:

(C)—PEEK/CF carbonized at 800° C.
(C+A)—PEEK/CF carbonized, and then activated in a flow of air
(C+A+$NH_3$)—PEEK/CF carbonized, activated, and exposed to $NH_3$ Results are shown in Table 1, and they indicate that carbon activation introduces oxygen functionalities onto the carbon surface, and also that carbon exposure to ammonia results in the formation of nitrogen functionalities on the surface. The speciation of nitrogen functionalities for sample C+A+$NH_3$ is given in FIG. 12. It can be seen that nitrogen is associated with oxygen in the N—C=O and N—(COO) functionalities, which is consistent with the strong enhancement of ammonia sorption capacity by surface oxidation (U.S. Pat. No. 9,073,039; Wójtowicz et. al., 2012). Since samples subjected to XPS analysis are outgassed in high vacuum, only the species that are strongly (irreversibly) bound can be analyzed. Thus, there is evidence that some irreversibly bound ammonia is present on the carbon surface, but the amount of such species is likely much lower than in the case of activated carbons derived from coal, coconut shells, and other organic precursors that, in contrast to polymer-derived carbons, contain appreciable amounts of impurities. In the case of acid-impregnated activated-carbon, the amount of irreversible ammonia is certainly even larger, as evidenced by the poor regenerability of such carbons reported by Paul and Jennings, 2009.

TABLE 1

Relative elemental composition (atom %) at the carbon sorbent surface; see text for sample identification.

| Sample | C | O | N |
|---|---|---|---|
| C | 96.1 | 3.9 | — |
| C + A | 84.3 | 15.7 | — |
| C + A + $NH_3$ | 83.5 | 15.5 | 1.0 |

Sorbent Testing

1. Ammonia and Formaldehyde Sorption and Sorbent Regeneration

Figure 13:
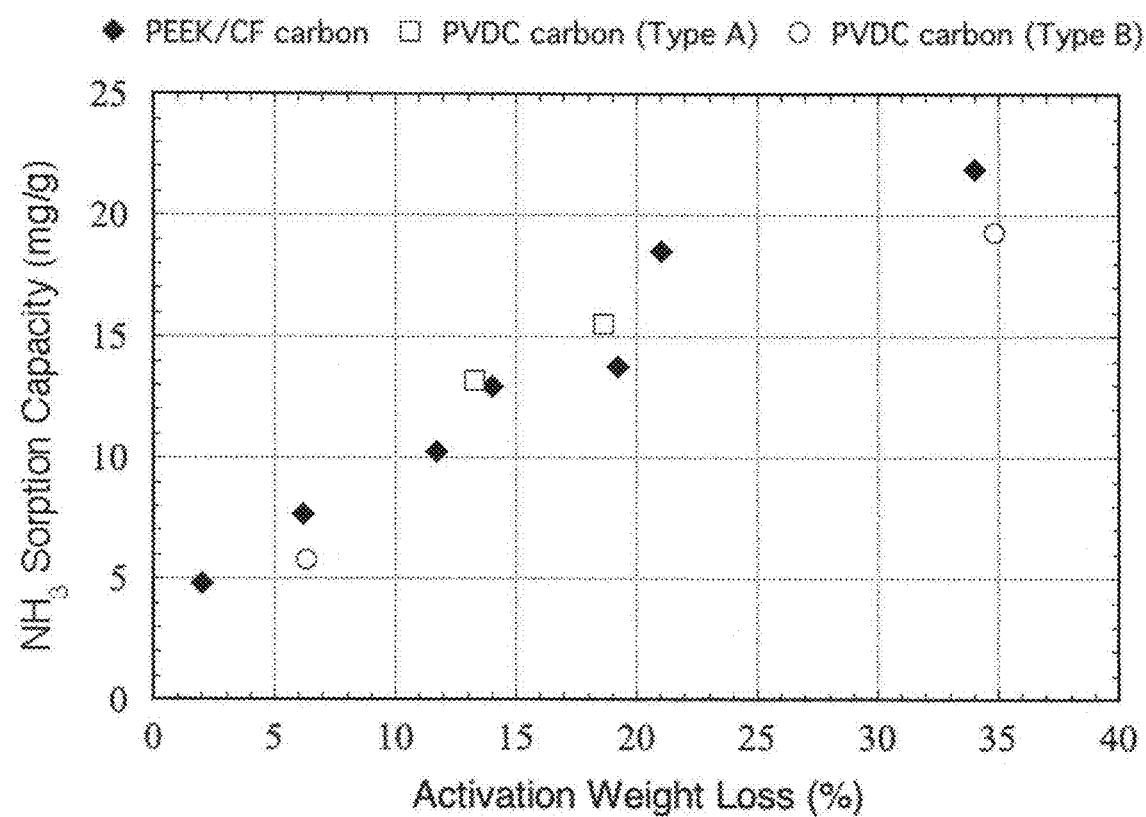
FIG. 13 is a plot of ammonia-sorption capacity (mg $NH_3$/g carbon sorbent) versus oxidation weight loss for granular carbons derived from PEEK/CF (diamonds) and PVDC (squares and circles). (The squares are for PVDC carbon granules of Type A, and circles are for PVDC carbon granules of Type B.) The measurements for the PEEK/CF do not account for the presumed parasitic weight of the carbon fibers, but this effect is small as carbon fibers constitute only ~10 wt % of the PEEK/CF filament. PVDC-carbon data are from Wójtowicz et al., 2015.

Ammonia Sorption on Granular Sorbents—Several PEEK/CF granular sorbents were prepared using the carbonization and mild-oxidation (activation) techniques described by Wójtowicz et al., 2012. Samples of these carbons, which had different degrees of oxidation burn-off, were used to determine the equilibrium ammonia sorption capacity at room temperature. These data were then compared with results of previous work on PVDC-based sorbents (Wójtowicz et al, 2015), and this comparison is shown in FIG. 13. It can be seen that the sorbents derived from the PEEK/CF filament perform as well as the PVDC-based sorbents, even though no sorbent optimization was attempted.

Figure 14:
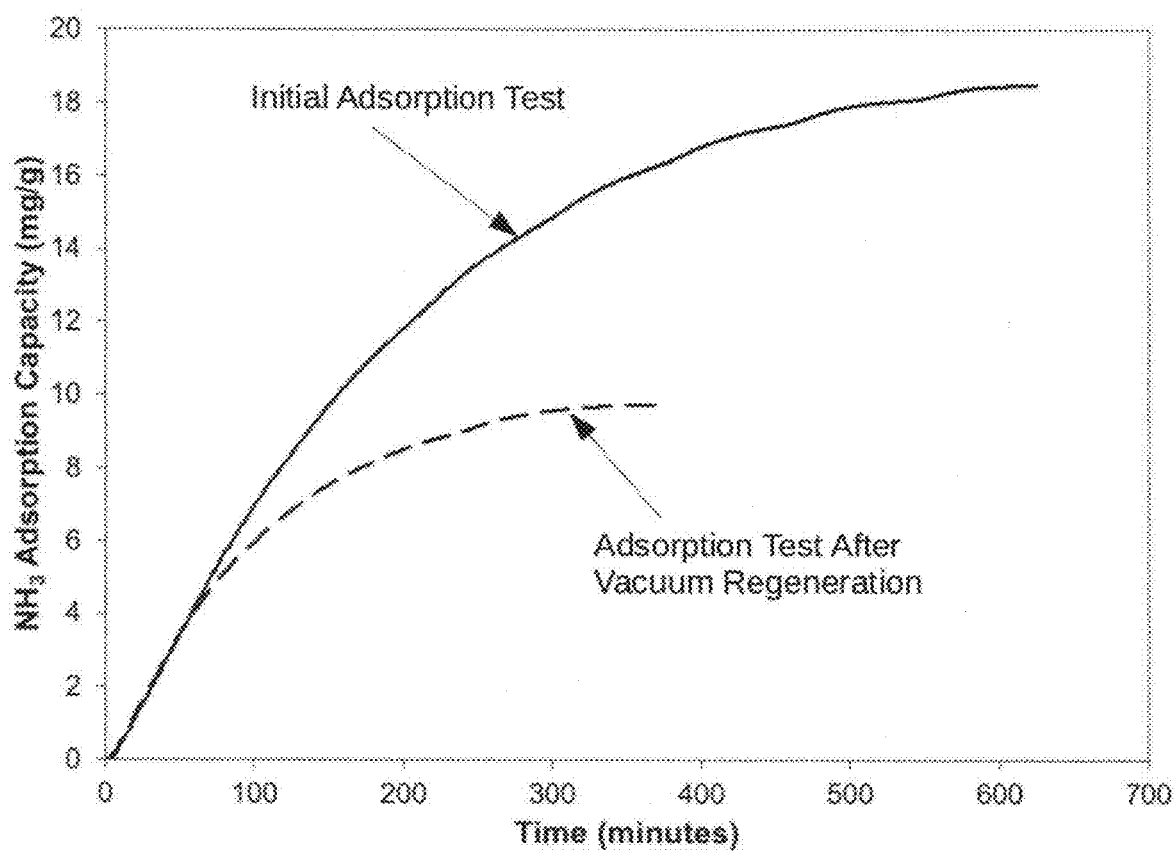
FIG. 14 is a plot of ammonia-sorption capacity for the PEEK/CF-based sorbent before and after vacuum regeneration.

Regeneration of Sorbents Supported on Reticulated Carbon Foam—A test sample was produced by impregnating reticulated carbon foam with pure PEEK powder, followed by carbonization and low temperature oxidation, as described by Wójtowicz et al., 2012. After the initial ammonia-sorption test, regeneration was performed by exposing the sample to high vacuum (ultimate vacuum ~5×10 Torr) for 6 hours. Slightly better than 50% regeneration was achieved (FIG. 14), which is consistent with previous results obtained with PVDC-derived carbon samples of the same form (Wójtowicz et al., 2012). Thus, it is fair to conclude that PEEK/CF is a promising material for monolithic TC sorbents in terms of: (1) shape retention upon carbonization; (2) ammonia sorption; and (3) vacuum regeneration.

Ammonia Sorption and Sorbent Regeneration for Carbon Monoliths—Vacuum regeneration of ammonia sorbent is a critically important feature of the sorbent monolith of this invention. Trace contaminant sorption on high-purity carbons that have not been impregnated with any acids, and that are essentially free of mineral impurities, is governed mostly by physical adsorption (physisorption) rather than irreversible, or almost irreversible, chemisorption, which dominates trace contaminant sorption on acid-treated or mineral-matter containing carbons. For this reason, little or no loss of sorption capacity is expected in the instant sorbents following initial cycles of ammonia adsorption-desorption. In contrast, acid-treated carbons normally show little or no recovery of their original sorption capacity after the first chemisorption event (Paul and Jennings, 2009).

Figure 15:
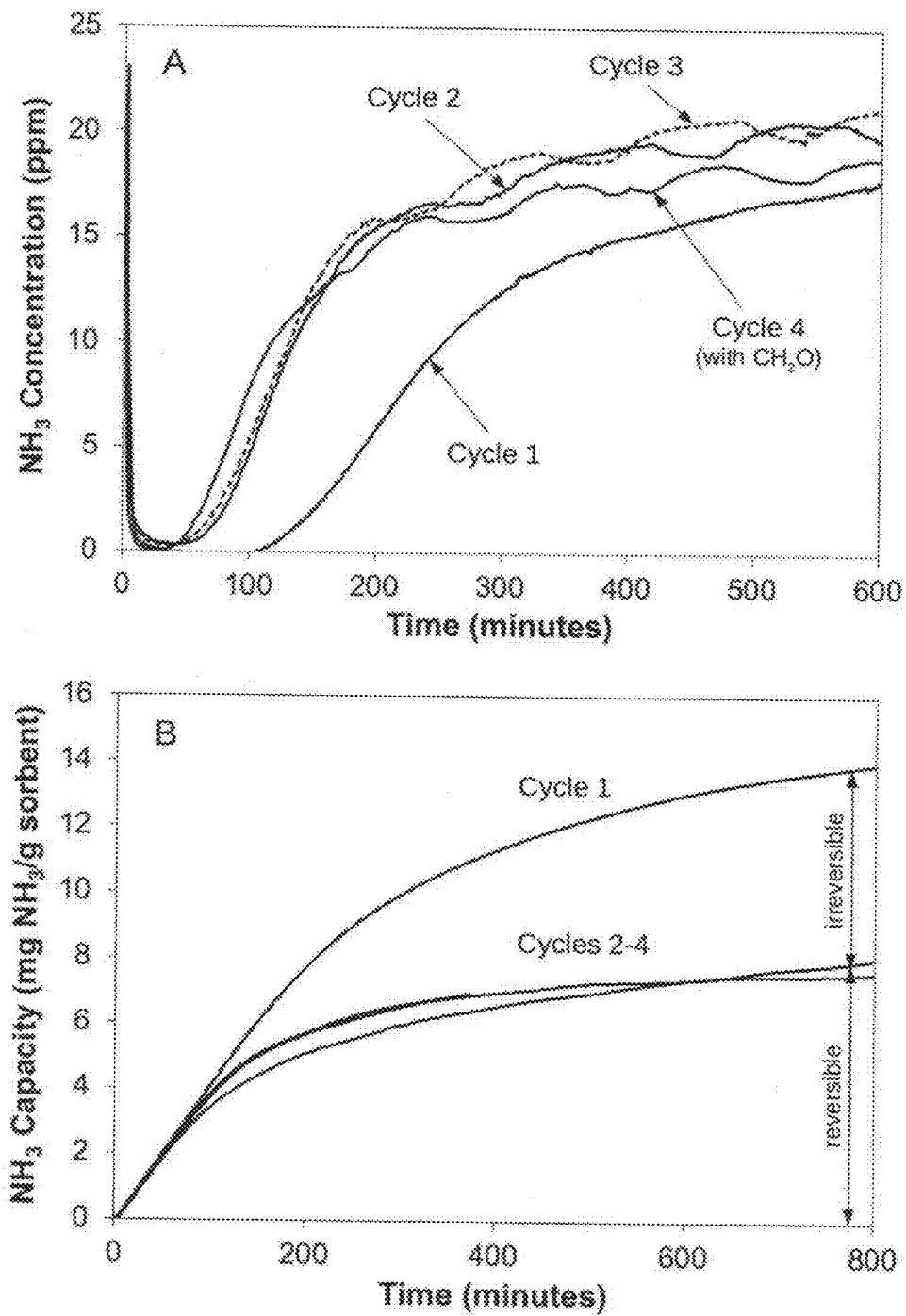
FIG. 15 (A and B) consists of two plots for ammonia sorption and sorbent regeneration cycles for a PEEK-based carbon monolith. Breakthrough curves (outlet concentration versus time) are shown on the left (part A), and the corresponding sorption-capacity curves on the right (part B). Relative amounts of reversibly and irreversibly bound ammonia are indicated in the sorption-capacity curves. The inlet-gas composition was: 20 ppm $NH_3$, 1.0 vol. % $CO_2$, 29 vol. % $O_2$, and balance nitrogen in Cycles 1-3, and additionally 3 ppm formaldehyde in Cycle 4. All experiments were performed under dry-gas conditions.

As expected, no loss of sorption capacity beyond the first adsorption-regeneration cycle was observed in a series of experiments involving a PEEK/CF carbon sorbent monolith which was subjected to repeated ammonia adsorption-desorption cycles (FIG. 15A and FIG. 15B). It can be seen in FIG. 15 that the loss of sorption capacity is essentially limited to the first cycle, and that this loss is modest (about 40% of the initial sorption capacity, as shown in FIG. 15B). This initial loss of sorbent activity may be due to the limited irreversible sorption that takes place on some strongly acidic sites that may exist even in high-purity carbons, the number of sites showing the reversible sorption being significant. In contrast, the loss of ammonia-sorption capacity in the case of acid-impregnated carbon is a factor of eight (U.S. Pat. No. 9,073,039), and such loss of activity also dominates the behavior of carbons that contain mineral matter.

Data presented in FIG. 15 (parts A and B) were collected on the same sample subjected to four sorption-regeneration cycles. Vacuum regeneration was performed at room temperature by removing the sorbent from the test cell and placing it in a high-vacuum chamber for six hours (typically reaching ~0.9×10$^{-7}$ Torr). The gas flow rate of 1.0 L/min was used, and the gas composition was: 20 ppm $NH_3$, 1.0 vol. % $CO_2$, 29 vol. % $O_2$, and balance nitrogen in Cycles 1-3, and additionally 3 ppm formaldehyde in Cycle 4. As in the case of granular sorbents, slightly better than 50% regeneration was achieved in Cycle 1, and the sorption capacity was found to stay unchanged in Cycles 2-4. This behavior is consistent with prior work on PVDC carbon sorbents (Wójtowicz et al., 2012).

Figure 16:
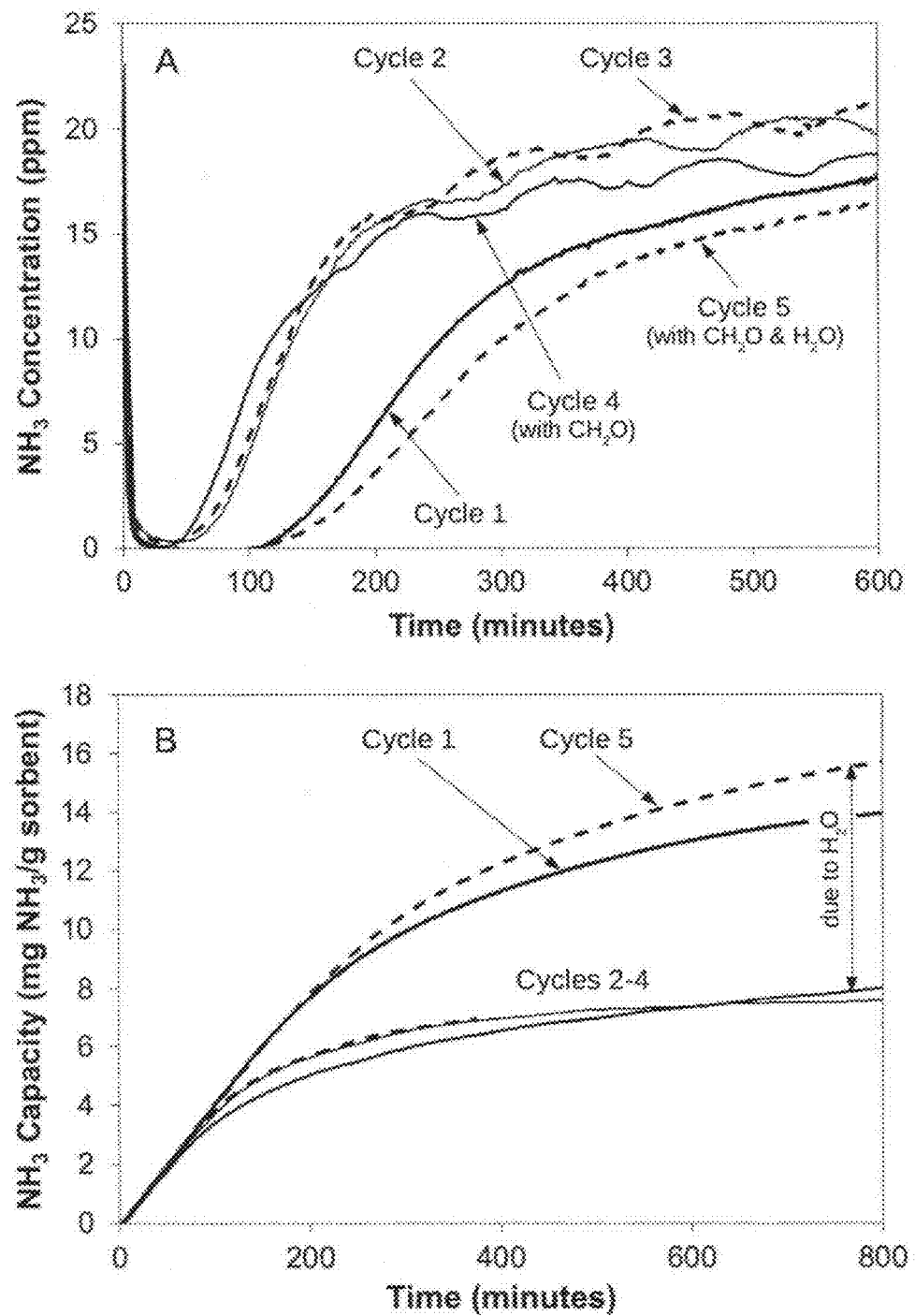
FIG. 16 (A and B) consists of two plots of ammonia sorption and sorbent regeneration cycles for a PEEK-based carbon monolith under dry-gas (Cycles 1-4) and humid-gas (Cycle 5) conditions. Breakthrough curves are shown on the left (part A), and the corresponding sorption-capacity curves on the right (part B). The inlet-gas composition was: 20 ppm $NH_3$, 1.0 vol. % $CO_2$, 29 vol. % $O_2$, and balance nitrogen in Cycles 1-3, additionally 3 ppm formaldehyde in Cycle 4, and additionally 3 ppm formaldehyde and water at a relative humidity of 40% in Cycle 5.

The Effect of Humidity on Ammonia Sorption—An additional experiment, i.e. Cycle 5, was performed using the same sorbent discussed in the previous section. This time, the gas composition was the same as in Cycle 4, except a relative humidity of 40% was used. Data in FIG. 16, parts A and B, show that the presence of water in the inlet gas leads to enhanced ammonia sorption by a factor of two. This is presumably due to the additional ammonia capture by dissolution in the aqueous phase adsorbed on the monolith. The above result is in agreement with previous work on PVDC-based carbons (Wójtowicz et al., 2012).

Formaldehyde Sorption—Formaldehyde adsorption on a PEEK-based carbon monolith was carried out, and it was found that, under conditions used in this work, the breakthrough never occurred, which means that all the formaldehyde present in the inlet gas got adsorbed. The test had to be aborted after more than 1,000 minutes (~17 hours) of excellent sorbent performance.

Ammonia Sorption under Rapid-Cycling Conditions—The large ammonia equilibrium sorption capacity demonstrated by PEEK-carbon monoliths (up to 20 mg $NH_3$ per gram of sorbent) is certainly an attractive feature of this technology. The fact that multiple adsorption-desorption cycles can be performed without sorption-capacity degradation (except for Cycle 1, as discussed above) is also encouraging. What these experiments do not reveal, however, is desorption kinetics, which are of paramount importance if the preferred mode of operation is rapid cycling with a frequency of several minutes.

In order to evaluate the suitability of PEEK-carbon monoliths for rapid cycling pressure swing operation, the following experiment was carried out. A carbon monolith derived from PEEK/CF was exposed to a flow of 20 ppm ammonia over more than 18 hours to reach the state of complete sorbent saturation with ammonia. The sorbent was then subjected to rapid sorption-desorption cycles, with each adsorption and desorption step taking 5 minutes. The gas flow rate was 1.0 L/min, and the carbon weight was 0.25 g. Vacuum regeneration (desorption) was performed using a roughing pump capable of providing only ~0.35 Torr vacuum at the sample location during the pumpdown. This of course was far from ideal, but the objective of this experiment was to see if the sorbent's response was fast enough, even though its sorption performance may have been reduced due to the poor vacuum.

Figure 17:
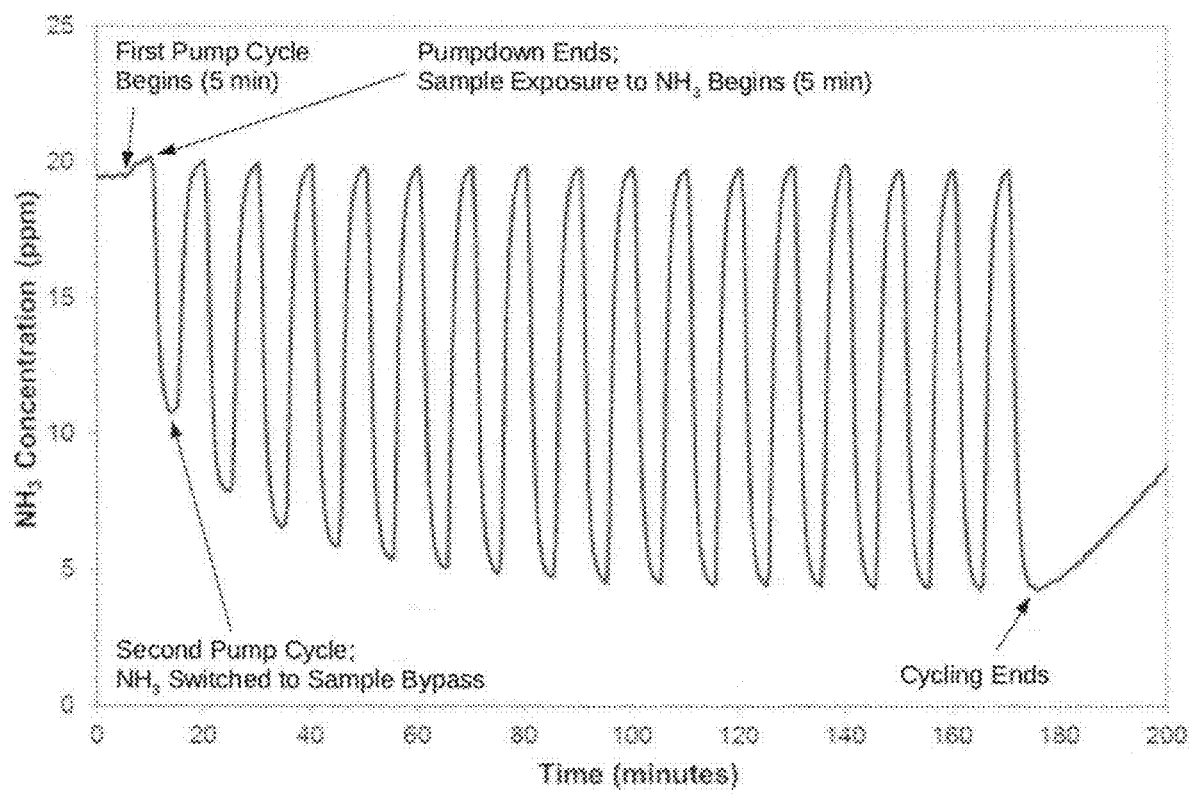
FIG. 17 is a curve showing results of rapid-cycle testing of a PEEK-carbon sorbent monolith using a roughing pump with a vacuum of ~0.35 Torr. The sorbent weight used was 0.25 g, and the gas flow rate was 1.0 L/min.

Results are shown in FIG. 17, and they are impressive, especially in view of the poor-quality vacuum used. As can be seen from the curve, the sorbent response is rapid, with the outlet ammonia concentration dropping from 20 ppm to 5 ppm in each adsorption cycle under steady-state conditions. The first few cycles show worse performance, and this is almost certainly due to the fact that the initial sorbent condition is full saturation; i.e. it simply takes a few cycles for the inventory of the adsorbed ammonia to be cleared from the carbon surface by the action of the roughing pump. This transient operation does not take long, however, and the sorbent soon reaches what appears to be a stable steady-state operation.

Figure 18:
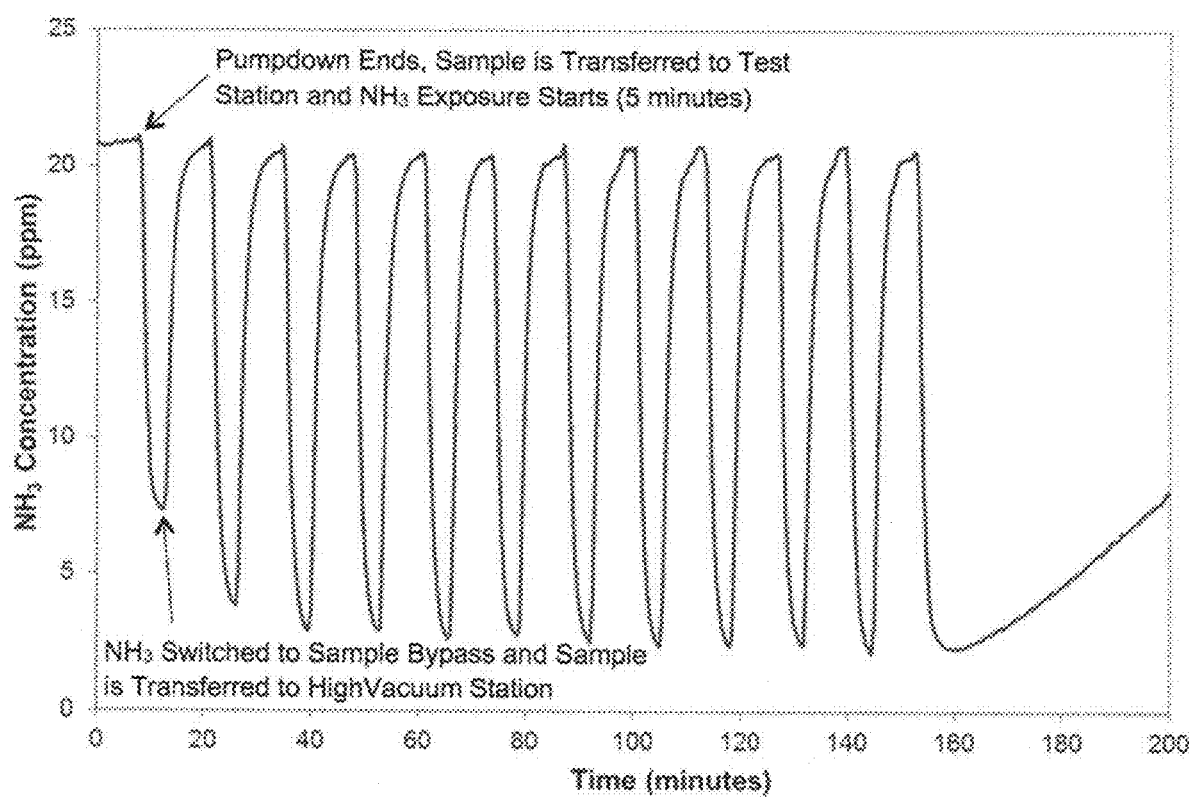
FIG. 18 is a curve showing results of rapid-cycle testing of a PEEK-carbon sorbent monolith using regeneration in a high-vacuum station (~$4 \times 10^{-5}$ Torr). The sorbent weight used was 0.25 g, and the gas flow rate was 1.0 L/min.

The effect of improved vacuum quality on sorbent performance was addressed in a separate experiment, and results of the fast cycle regeneration test that was conducted under improved vacuum conditions are shown in FIG. 18. The sample (carbon mass 0.25 g) was the same monolith that was tested at ~0.35 Torr conditions (see FIG. 17). As before, the sample was re-saturated by exposure to 20 ppm $NH_3$ (in $CO_2/O_2$ and $N_2$) at 1 L/min for more than 18 hours. Regeneration was performed by transferring the sample to a high-vacuum chamber (estimated volume ~2 ft) fitted with a turbomolecular pump/rotary vane pump system. The regeneration period was 5 minutes and consisted of 3 steps: (1) an initial chamber rough pumpdown to 0.3 Torr using the rotary pump (~1.5 min); (2) turning on the turbopump for a period of ~3 minutes; and (3) shutdown of the pump system and dry air backfill (~30 s). Under these conditions, the sample was actually exposed to high vacuum for less than 3 minutes, and the lowest vacuum levels achieved were only ~4×10$^{-5}$ Torr. The sample was then transferred back to the test station and immediately re-exposed to 20 ppm $NH_3$ at 1 L/min for 5 minutes. The transfer period to and from the pump station was ~1.5 minutes, which accounts for the total apparent cycle period (exposure plus regeneration) of ~13 minutes seen in the data. It is assumed that regeneration at ambient conditions during the transfer period was negligible.

General observations are as follows:

The vacuum system that was employed for regeneration was not ideal for these tests. Its ability to provide high vacuum pumping was hampered by the large chamber volume, causing the relatively long roughing and backfill periods.

Despite the limitations of the apparatus that was employed, a significant improvement in the ammonia knockdown was achieved, reaching concentrations lower than 2.5 ppm at the outlet.

Although not extensively tested over hundreds of cycles, the currently available data demonstrate the feasibility of using PEEK-carbon monoliths for pressure-swing operation with cycle times of a few minutes.

2. Pressure Drop

One of the main advantages of the monolithic structure is a low pressure drop, which also means a low fan-power requirement. To get an idea about the magnitude of the pressure drop across the sorbent monolith, calculations were performed using the approach described by Cybulski and Moulijn ("Monoliths in Heterogeneous Catalysis," Catalysis Reviews, 36(2), 179-270, 1994). Input information for the calculations is summarized below.

Monolith with square channels 1 mm×1 mm
Monolith diameter: 18 mm
Number of channels: 141
Monolith height: 6 mm
Channel wall thickness: 0.25 mm
Outer wall thickness: 0.50 mm
Air flow rate: 1 L/min
Air temperature: 30° C.

Under the above conditions, calculations showed that the pressure drop was immeasurably small. Although no meaningful measurements of such a low pressure drop could easily be performed, pressure-drop measurement at much higher flow rates were carried out. The flow resistance was determined using a small laboratory system previously described (Wójtowicz et al., 2012). The gas flow rate was measured by a flow meter, and pressure gauges were used to determine pressure upstream and downstream of the sorbent element.

Figure 19:
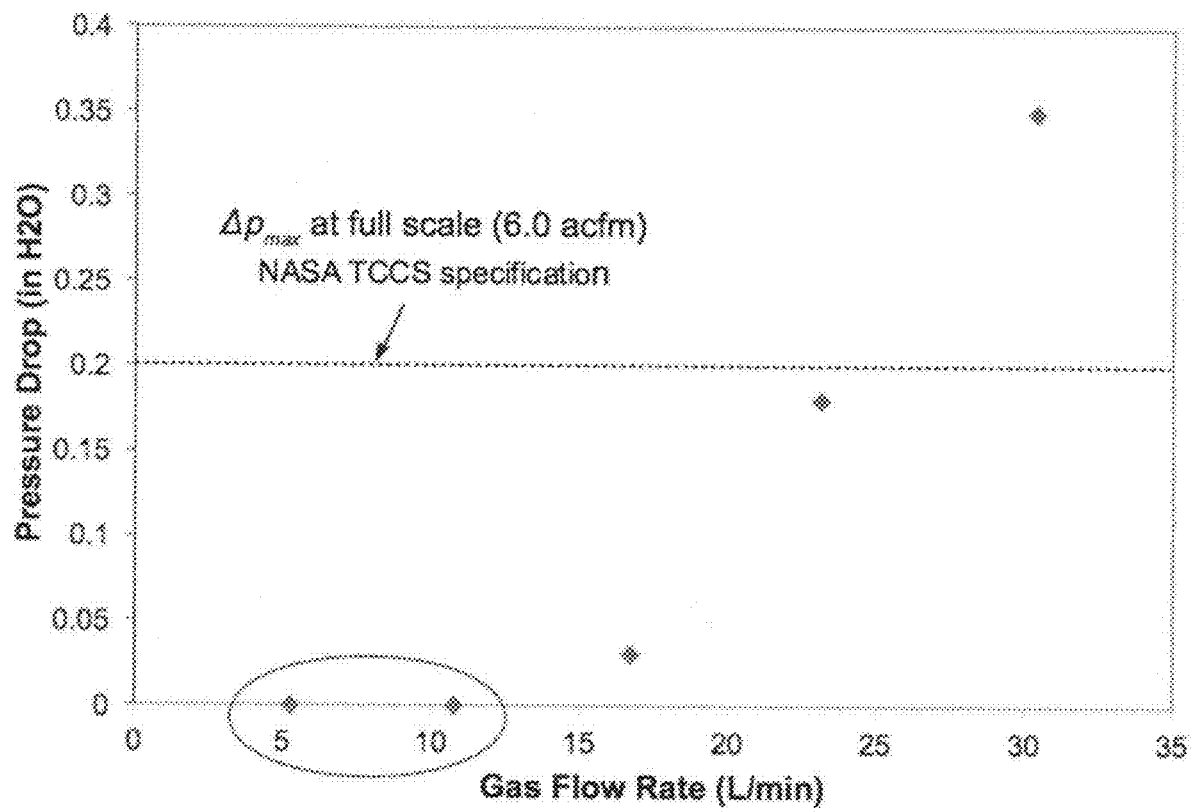
FIG. 19 is a curve showing results of pressure drop measurements for an 18-mm diameter, 6-mm high PEEK-carbon sorbent. The pressure drop is negligibly small for this sorbent geometry for flow rates below 10 L/min. The maximum pressure drop for a full-scale Trace Contaminant Control System (TCCS) is marked for reference. The full-scale system will have a much larger cross-sectional area than the 18-mm diameter sorbent monolith used in the pressure-drop measurements.

Experimental results presented in FIG. 19 show that monolithic sorbents will indeed have a tremendous advantage over granular ones, which will lead to significant savings in fan-power demand. In agreement with the calculations presented above, the pressure drop at 1 L/min is negligibly small.

3. Mechanical Strength

One of the shortcomings of granular carbon sorbents currently used for TC control is attrition and the release of fine particles, which may take place, for example, due to vibrations occurring during spacecraft launch. It is expected that carbon monoliths will exhibit better resistance to vibrations. A preliminary evaluation of the mechanical integrity of a prototype test unit subjected to vibration was performed using a laboratory sieve shaker (CSC Scientific model no. 18480). The test cell was clamped directly to the shaker stage and shaken for a period of 5 minutes at an intermediate setting of 5 on the sieve shaker. No evidence of damage to the carbon monolith, such as fracture or shedding, was found. Although the above test is not directly linked to any standard testing methodology, it nonetheless provides evidence of mechanical robustness of PEEK-derived carbon sorbent monoliths.

Thus, it can be seen that the above-stated objects of the invention are attained by the method and product described in the foregoing specification and defined by the appended claims.

Having thus described the invention, what is claimed is:

1. A method for the production of a carbon sorbent monolith for removing at least one gas from a gaseous environment in which the at least one gas is contained, comprising the steps:

3D-printing of a polymer monolith from a polymer precursor;

carbonizing said polymer monolith so as to produce a high-purity carbon monolith by exposure to elevated temperatures of at least 500° C. in a non-oxidative atmosphere; and activating said high-purity carbon monolith by exposure to an oxidizing environment under conditions sufficient to produce a microporous sorbent monolith with a surface area of at least 100 m$^2$/g, with the majority of pores being smaller than 2 nm.

2. The method of claim 1 wherein said polymer precursor is selected from the group consisting of polyether ether ketone, polyetherimide, and polycarbonate, and mixtures thereof.

3. The method of claim 1 wherein said polymer precursor comprises at least 70 weight percent of polyether ether ketone.

4. The method of claim 1 wherein said polymer precursor comprises reinforcement in the form of fibers for improved shape retention during carbonization and enhanced strength.

5. The method of claim 4 wherein said fibers are carbon fibers.

6. The method of claim 1 wherein said high-purity carbon monolith consists essentially of high-purity carbon, effectively free from mineral contaminants in elemental or molecular state.

7. The method of claim 1 wherein said polymer monolith is constrained by supporting structures to prevent the loss of shape of said polymer monolith during said exposure to elevated temperatures.

8. The method of claim 7 wherein said supporting structures comprise vertically positioned dowel pins as well as top, bottom, and side support plates.

9. The method of claim 7 wherein said supporting structures comprise a side support plate, and top and bottom support plates from which pins extend.

10. The method of claim 1 wherein said oxidizing environment is selected from the group consisting, of air, oxygen, carbon dioxide, steam, ozone, hydrogen peroxide, nitric acid, and mixtures thereof.

11. The method of claim 10 wherein said oxidizing environment comprises air at a temperature in the range of 150° C. to 400° C., and wherein the time of exposure is at least 5 minutes.

12. The method of claim 11 wherein said temperature range is 250° C. to 325° C., and said time of exposure is 24 to 300 hours.

* * * * *